(12) United States Patent
Constantz et al.

(10) Patent No.: US 7,966,250 B2
(45) Date of Patent: Jun. 21, 2011

(54) $CO_2$ COMMODITY TRADING SYSTEM AND METHOD

(75) Inventors: Brent R. Constantz, Portola Valley, CA (US); Vinod Khosla, Menlo Park, CA (US); Aurelia Setton, Palo Alto, CA (US); Robert Danziger, Carmel, CA (US); Andrew Youngs, Antelope, CA (US); James R. O'Neil, Palo Alto, CA (US); Chris Camire, San Jose, CA (US); Cecily Ryan, San Jose, CA (US); Manuel Jose Concha Soler, Providencia (CL)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/557,492

(22) Filed: Sep. 10, 2009

(65) Prior Publication Data

US 2010/0063902 A1 Mar. 11, 2010

Related U.S. Application Data

(60) Provisional application No. 61/117,541, filed on Nov. 24, 2008, provisional application No. 61/101,629, filed on Sep. 30, 2008, provisional application No. 61/096,035, filed on Sep. 11, 2008.

(51) Int. Cl.
*G06Q 40/00* (2006.01)
(52) U.S. Cl. ............................................. 705/37; 705/35
(58) Field of Classification Search .................. 705/35, 705/36 R, 37; 423/169, 220, 232, 432
See application file for complete search history.

(56) References Cited

U.S. PATENT DOCUMENTS

| | | | |
|---|---|---|---|
| 1,678,345 | A | 7/1928 | Mattison |
| 1,865,833 | A | 7/1932 | Chesny |
| 1,897,725 | A | 2/1933 | Gaus et al. |
| 2,304,391 | A | 12/1942 | Zimmerman |
| 2,329,940 | A | 9/1943 | Ponzer |
| 2,383,674 | A | 8/1945 | Osborne |
| 2,458,039 | A | 1/1949 | Wait |
| 2,606,839 | A | 8/1952 | Evans |
| 2,934,419 | A | 4/1960 | Cook |
| 2,967,807 | A | 1/1961 | Osborne et al. |
| 3,046,152 | A | 7/1962 | Tsuneyoshi |
| 3,120,426 | A | 2/1964 | Crawford, Jr. |
| 3,179,579 | A | 4/1965 | Gustave et al. |
| 3,196,092 | A | 7/1965 | Beer |
| 3,202,522 | A | 8/1965 | Yang et al. |

(Continued)

FOREIGN PATENT DOCUMENTS

AU 2007100157 4/2007

(Continued)

OTHER PUBLICATIONS

Shaffer, Richard. "A Devlish Green Angel." Fast Company, n127, pp. 92-97, Jul./Aug. 2008.*

(Continued)

*Primary Examiner* — James A Kramer
*Assistant Examiner* — Martin A Gottschalk

(57) ABSTRACT

A system and method of generating and trading a $CO_2$ commodity that is correlated to a quantified amount of $CO_2$ sequestered in a $CO_2$ sequestering product comprising a carbonate and/or a bicarbonate. The tradable commodity can be purchased or sold for use in managing $CO_2$ emissions.

32 Claims, 5 Drawing Sheets

U.S. PATENT DOCUMENTS

| | | | |
|---|---|---|---|
| 3,350,292 A | 10/1967 | Weinberger et al. | |
| 3,374,164 A | 3/1968 | Balej et al. | |
| 3,420,775 A | 1/1969 | Cadwallader | |
| 3,463,814 A | 8/1969 | Blanco et al. | |
| 3,466,169 A | 9/1969 | Nowak et al. | |
| 3,511,595 A | 5/1970 | Fuchs | |
| 3,511,712 A | 5/1970 | Giner | |
| 3,525,675 A | 8/1970 | Gaudin | |
| 3,558,769 A | 1/1971 | Globus | |
| 3,574,530 A | 4/1971 | Suriani et al. | |
| 3,627,479 A | 12/1971 | Yee | |
| 3,627,480 A | 12/1971 | Birchall | |
| 3,630,762 A | 12/1971 | Olton et al. | |
| 3,725,267 A | 4/1973 | Gelblum | |
| 3,864,236 A | 2/1975 | Lindstrom | |
| 3,904,496 A | 9/1975 | Harke et al. | |
| 3,917,795 A | 11/1975 | Pelczarski et al. | |
| 3,925,534 A | 12/1975 | Singleton et al. | |
| 3,953,568 A | 4/1976 | Seko et al. | |
| 3,963,592 A | 6/1976 | Lindstrom | |
| 3,970,528 A | 7/1976 | Zirngiebl et al. | |
| 4,026,716 A | 5/1977 | Urschel, III et al. | |
| 4,036,749 A | 7/1977 | Anderson | |
| 4,080,270 A | 3/1978 | O'Leary et al. | |
| 4,106,296 A | 8/1978 | Leonard, Jr. et al. | |
| 4,107,022 A | 8/1978 | Strempel et al. | |
| 4,128,462 A | 12/1978 | Ghiringhelli et al. | |
| 4,140,510 A | 2/1979 | Scholze et al. | |
| 4,147,599 A | 4/1979 | O'Leary et al. | |
| 4,164,537 A | 8/1979 | Drostholm et al. | |
| 4,188,291 A | 2/1980 | Anderson | |
| 4,217,186 A | 8/1980 | McRae | |
| 4,242,185 A | 12/1980 | McRae | |
| 4,246,075 A | 1/1981 | Hilbertz | |
| 4,264,367 A | 4/1981 | Schutz | |
| 4,308,298 A | 12/1981 | Chen | |
| 4,335,788 A | 6/1982 | Murphey et al. | |
| 4,361,475 A | 11/1982 | Moeglich | |
| 4,370,307 A | 1/1983 | Judd | |
| 4,376,101 A | 3/1983 | Sartori et al. | |
| 4,410,606 A | 10/1983 | Loutfy et al. | |
| 4,450,009 A | 5/1984 | Childs et al. | |
| 4,477,573 A | 10/1984 | Taufen | |
| 4,561,945 A | 12/1985 | Coker et al. | |
| 4,588,443 A | 5/1986 | Bache | |
| 4,620,969 A | 11/1986 | Wilkinson | |
| 4,716,027 A | 12/1987 | Morrison | |
| 4,804,449 A | 2/1989 | Sweeney | |
| 4,818,367 A | 4/1989 | Winkler | |
| 4,838,941 A | 6/1989 | Hill | |
| 4,899,544 A | 2/1990 | Boyd | |
| 4,915,914 A | 4/1990 | Morrison | |
| 4,931,264 A | 6/1990 | Rochelle et al. | |
| 5,037,286 A | 8/1991 | Roberts | |
| 5,100,633 A | 3/1992 | Morrison | |
| 5,230,734 A | 7/1993 | Kumasaka et al. | |
| 5,246,551 A | 9/1993 | Pletcher et al. | |
| 5,282,935 A | 2/1994 | Cawlfield et al. | |
| 5,362,688 A | 11/1994 | Porta et al. | |
| 5,364,611 A | 11/1994 | Iijima et al. | |
| 5,366,513 A | 11/1994 | Goldmann et al. | |
| 5,388,456 A * | 2/1995 | Kettel | 73/152.02 |
| 5,470,671 A | 11/1995 | Fletcher et al. | |
| 5,520,898 A | 5/1996 | Pinnavaia et al. | |
| 5,531,821 A | 7/1996 | Wu | |
| 5,531,865 A | 7/1996 | Cole | |
| 5,547,027 A | 8/1996 | Chan et al. | |
| 5,584,923 A | 12/1996 | Wu | |
| 5,584,926 A | 12/1996 | Borgholm et al. | |
| 5,595,641 A | 1/1997 | Traini et al. | |
| 5,614,078 A | 3/1997 | Lubin et al. | |
| 5,624,493 A | 4/1997 | Wagh et al. | |
| 5,702,585 A | 12/1997 | Hillrichs et al. | |
| 5,766,338 A | 6/1998 | Weber | |
| 5,766,339 A | 6/1998 | Babu et al. | |
| 5,776,328 A | 7/1998 | Traini et al. | |
| 5,785,868 A | 7/1998 | Li et al. | |
| 5,846,669 A | 12/1998 | Smotkin et al. | |
| 5,855,759 A | 1/1999 | Keating et al. | |
| 5,897,704 A | 4/1999 | Baglin | |
| 5,925,255 A | 7/1999 | Mukhopadhyay | |
| 5,965,201 A | 10/1999 | Jones, Jr. | |
| 6,024,848 A | 2/2000 | Dufner et al. | |
| 6,059,974 A | 5/2000 | Scheurman, III | |
| 6,071,336 A | 6/2000 | Fairchild et al. | |
| 6,080,297 A | 6/2000 | Ayers | |
| 6,090,197 A | 7/2000 | Vivian et al. | |
| 6,129,832 A | 10/2000 | Fuhr et al. | |
| 6,180,012 B1 | 1/2001 | Rongved | |
| 6,190,428 B1 | 2/2001 | Rolison et al. | |
| 6,200,381 B1 | 3/2001 | Rechichi | |
| 6,200,543 B1 | 3/2001 | Allebach et al. | |
| 6,217,728 B1 | 4/2001 | Lehmann et al. | |
| 6,235,186 B1 | 5/2001 | Tanaka et al. | |
| 6,251,356 B1 | 6/2001 | Mathur | |
| 6,264,740 B1 | 7/2001 | McNulty, Jr. | |
| 6,280,505 B1 | 8/2001 | Torkildsen et al. | |
| 6,352,576 B1 | 3/2002 | Spencer et al. | |
| 6,375,825 B1 | 4/2002 | Mauldin et al. | |
| 6,387,212 B1 | 5/2002 | Christian | |
| 6,402,831 B1 | 6/2002 | Sawara et al. | |
| 6,416,574 B1 | 7/2002 | Steelhammer et al. | |
| 6,444,107 B2 | 9/2002 | Hartel et al. | |
| 6,475,460 B1 | 11/2002 | Max | |
| 6,495,013 B2 | 12/2002 | Mazur et al. | |
| 6,517,631 B1 | 2/2003 | Bland | |
| 6,518,217 B2 | 2/2003 | Xing et al. | |
| 6,537,456 B2 | 3/2003 | Mukhopadhyay | |
| 6,602,630 B1 | 8/2003 | Gopal | |
| 6,623,555 B1 | 9/2003 | Haverinen et al. | |
| 6,638,413 B1 | 10/2003 | Weinberg et al. | |
| 6,648,949 B1 | 11/2003 | Der et al. | |
| 6,712,946 B2 | 3/2004 | Genders et al. | |
| 6,755,905 B2 | 6/2004 | Oates et al. | |
| 6,776,972 B2 | 8/2004 | Dave et al. | |
| 6,786,963 B2 | 9/2004 | Matherly et al. | |
| 6,841,512 B1 | 1/2005 | Fetcenko et al. | |
| 6,890,419 B2 | 5/2005 | Reichman et al. | |
| 6,890,497 B2 | 5/2005 | Rau et al. | |
| 6,908,507 B2 | 6/2005 | Lalande et al. | |
| 6,936,573 B2 | 8/2005 | Wertz et al. | |
| 7,037,434 B2 | 5/2006 | Myers et al. | |
| 7,040,400 B2 | 5/2006 | de Rouffignac et al. | |
| 7,132,090 B2 | 11/2006 | Dziedzic et al. | |
| 7,135,604 B2 | 11/2006 | Ding et al. | |
| 7,198,722 B2 | 4/2007 | Hussain | |
| 7,261,912 B2 | 8/2007 | Zeigler | |
| 7,282,189 B2 | 10/2007 | Zauderer | |
| 7,285,166 B2 | 10/2007 | Luke et al. | |
| 7,347,896 B2 | 3/2008 | Harrison | |
| 7,427,449 B2 | 9/2008 | Delaney et al. | |
| 7,440,871 B2 | 10/2008 | McConnell et al. | |
| 7,452,449 B2 | 11/2008 | Weinberg et al. | |
| 7,455,854 B2 | 11/2008 | Gower et al. | |
| 7,595,001 B2 | 9/2009 | Arakel et al. | |
| 7,674,443 B1 | 3/2010 | Davis | |
| 2001/0022952 A1 | 9/2001 | Rau et al. | |
| 2001/0054253 A1 | 12/2001 | Takahashi et al. | |
| 2002/0009410 A1 | 1/2002 | Mathur | |
| 2002/0127474 A1 | 9/2002 | Fleischer et al. | |
| 2002/0151017 A1 * | 10/2002 | Stemmer et al. | 435/189 |
| 2003/0017088 A1 | 1/2003 | Downs et al. | |
| 2003/0123930 A1 | 7/2003 | Jacobs et al. | |
| 2003/0126899 A1 | 7/2003 | Wolken | |
| 2003/0188668 A1 | 10/2003 | Bland | |
| 2003/0213937 A1 | 11/2003 | Yaniv | |
| 2003/0229572 A1 * | 12/2003 | Raines et al. | 705/37 |
| 2004/0014845 A1 | 1/2004 | Takamura et al. | |
| 2004/0040671 A1 | 3/2004 | Duesel, Jr. et al. | |
| 2004/0040715 A1 | 3/2004 | Wellington et al. | |
| 2004/0052865 A1 | 3/2004 | Gower et al. | |
| 2004/0111968 A1 | 6/2004 | Day et al. | |
| 2004/0126293 A1 | 7/2004 | Geerlings et al. | |
| 2004/0213705 A1 | 10/2004 | Blencoe et al. | |
| 2004/0219090 A1 | 11/2004 | Dziedzic et al. | |
| 2004/0228788 A1 | 11/2004 | Nagai et al. | |
| 2004/0231568 A1 | 11/2004 | Morioka et al. | |

| | | | |
|---|---|---|---|
| 2004/0234443 A1 | 11/2004 | Chen et al. | |
| 2004/0259231 A1 | 12/2004 | Bhattacharya | |
| 2004/0267077 A1 | 12/2004 | Ding et al. | |
| 2005/0002847 A1 | 1/2005 | Maroto-Valer et al. | |
| 2005/0011770 A1 | 1/2005 | Katsuyoshi et al. | |
| 2005/0031522 A1 | 2/2005 | Delaney et al. | |
| 2005/0036932 A1 | 2/2005 | Takahashi et al. | |
| 2005/0087496 A1 | 4/2005 | Borseth | |
| 2005/0118081 A1 | 6/2005 | Harris et al. | |
| 2005/0129606 A1 | 6/2005 | Mitsuhashi et al. | |
| 2005/0154669 A1 | 7/2005 | Streetman | |
| 2005/0180910 A1* | 8/2005 | Park et al. | 423/432 |
| 2005/0232855 A1 | 10/2005 | Stevens et al. | |
| 2005/0238563 A1 | 10/2005 | Eighmy et al. | |
| 2005/0255174 A1 | 11/2005 | Shelley et al. | |
| 2006/0048517 A1 | 3/2006 | Fradette et al. | |
| 2006/0051274 A1* | 3/2006 | Wright et al. | 423/220 |
| 2006/0060532 A1 | 3/2006 | Davis | |
| 2006/0105082 A1 | 5/2006 | Zeigler | |
| 2006/0165583 A1 | 7/2006 | Makino et al. | |
| 2006/0169177 A1 | 8/2006 | Jardine et al. | |
| 2006/0169593 A1 | 8/2006 | Xu et al. | |
| 2006/0173169 A1 | 8/2006 | Cheryan | |
| 2006/0184445 A1 | 8/2006 | Sandor et al. | |
| 2006/0185516 A1 | 8/2006 | Moriyama et al. | |
| 2006/0185560 A1 | 8/2006 | Ramme et al. | |
| 2006/0185985 A1 | 8/2006 | Jones | |
| 2006/0195002 A1 | 8/2006 | Grandjean et al. | |
| 2006/0196836 A1 | 9/2006 | Arakel et al. | |
| 2006/0288912 A1 | 12/2006 | Sun et al. | |
| 2007/0056487 A1 | 3/2007 | Anthony et al. | |
| 2007/0092427 A1 | 4/2007 | Anthony et al. | |
| 2007/0148509 A1 | 6/2007 | Colbow et al. | |
| 2007/0163443 A1 | 7/2007 | Moriyama et al. | |
| 2007/0184394 A1* | 8/2007 | Comrie | 431/2 |
| 2007/0186820 A1 | 8/2007 | O'Hearn | |
| 2007/0187247 A1 | 8/2007 | Lackner et al. | |
| 2007/0202032 A1 | 8/2007 | Geerlings et al. | |
| 2007/0212584 A1 | 9/2007 | Chuang | |
| 2007/0217981 A1 | 9/2007 | Van Essendelft | |
| 2007/0233616 A1* | 10/2007 | Richards et al. | 705/400 |
| 2007/0240570 A1 | 10/2007 | Jadhav et al. | |
| 2007/0261947 A1 | 11/2007 | Geerlings et al. | |
| 2007/0266632 A1* | 11/2007 | Tsangaris et al. | 48/190 |
| 2008/0031801 A1 | 2/2008 | Lackner et al. | |
| 2008/0035036 A1* | 2/2008 | Bassani et al. | 110/224 |
| 2008/0059206 A1* | 3/2008 | Jenkins | 705/1 |
| 2008/0104858 A1* | 5/2008 | Carin et al. | 34/282 |
| 2008/0112868 A1 | 5/2008 | Blencoe et al. | |
| 2008/0134891 A1* | 6/2008 | Jarvenpaa | 95/205 |
| 2008/0138265 A1 | 6/2008 | Lackner et al. | |
| 2008/0171158 A1 | 7/2008 | Maddan | |
| 2008/0178739 A1 | 7/2008 | Lewnard et al. | |
| 2008/0223727 A1 | 9/2008 | Oloman et al. | |
| 2008/0236143 A1 | 10/2008 | Lo | |
| 2008/0245274 A1 | 10/2008 | Ramme | |
| 2008/0245660 A1 | 10/2008 | Little et al. | |
| 2008/0245672 A1 | 10/2008 | Little et al. | |
| 2008/0248350 A1 | 10/2008 | Little et al. | |
| 2008/0270272 A1* | 10/2008 | Branscomb | 705/30 |
| 2008/0275149 A1 | 11/2008 | Ladely et al. | |
| 2008/0276553 A1 | 11/2008 | Ingjaldsdottir et al. | |
| 2008/0277319 A1 | 11/2008 | Wyrsta | |
| 2008/0289495 A1 | 11/2008 | Eisenberger et al. | |
| 2009/0001020 A1 | 1/2009 | Constantz et al. | |
| 2009/0010827 A1 | 1/2009 | Geerlings et al. | |
| 2009/0020044 A1 | 1/2009 | Constantz et al. | |
| 2009/0043687 A1* | 2/2009 | van Soestbergen et al. | 705/37 |
| 2009/0081093 A1 | 3/2009 | Comrie | |
| 2009/0081096 A1 | 3/2009 | Pellegrin | |
| 2009/0090277 A1 | 4/2009 | Joshi et al. | |
| 2009/0143211 A1 | 6/2009 | Riman et al. | |
| 2009/0169452 A1 | 7/2009 | Constantz et al. | |
| 2009/0186244 A1 | 7/2009 | Mayer | |
| 2009/0202410 A1* | 8/2009 | Kawatra et al. | 423/232 |
| 2009/0214408 A1 | 8/2009 | Blake et al. | |
| 2009/0232861 A1 | 9/2009 | Wright et al. | |
| 2009/0301352 A1 | 12/2009 | Constantz et al. | |
| 2010/0024686 A1 | 2/2010 | Constantz et al. | |
| 2010/0037653 A1* | 2/2010 | Enis et al. | 62/532 |
| 2010/0077691 A1 | 4/2010 | Constantz et al. | |
| 2010/0077922 A1 | 4/2010 | Constantz et al. | |
| 2010/0083880 A1 | 4/2010 | Constantz et al. | |
| 2010/0084280 A1 | 4/2010 | Gilliam et al. | |
| 2010/0089142 A1* | 4/2010 | Sukhija et al. | 73/152.39 |

FOREIGN PATENT DOCUMENTS

| | | |
|---|---|---|
| CA | 1335974 A1 | 6/1995 |
| CA | 2646462 | 9/2007 |
| DE | 2653649 A1 | 6/1978 |
| DE | 3146326 A1 | 6/1983 |
| DE | 3638317 A1 | 1/1986 |
| DE | 19523324 A1 | 9/1994 |
| DE | 19631794 A1 | 8/1997 |
| EP | 0522382 A1 | 1/1993 |
| EP | 0487102 B1 | 8/1995 |
| EP | 0591350 B1 | 11/1996 |
| EP | 0628339 B1 | 9/1999 |
| EP | 0844905 B1 | 3/2000 |
| EP | 1379469 B1 | 3/2006 |
| EP | 1650162 A1 | 4/2006 |
| EP | 1716911 A1 | 11/2006 |
| EP | 1554031 B1 | 12/2006 |
| EP | 1571105 B1 | 12/2007 |
| GB | 911386 A | 11/1962 |
| GB | 1392907 | 5/1975 |
| GB | 2032441 | 5/1980 |
| GB | 2371810 | 8/2002 |
| JP | 51102357 A1 | 9/1976 |
| JP | 59100280 | 12/1982 |
| JP | 1142093 | 11/1987 |
| JP | 63-312988 | 12/1988 |
| JP | 03-020491 | 1/1991 |
| JP | 7061842 A | 3/1995 |
| JP | 2003041388 | 7/2001 |
| WO | WO 93/16216 A1 | 8/1993 |
| WO | WO 96/34997 A1 | 11/1996 |
| WO | WO 99/13967 A1 | 3/1999 |
| WO | WO 2006/009600 A2 | 1/2000 |
| WO | WO 01/07365 A1 | 2/2001 |
| WO | WO 01/96243 A1 | 12/2001 |
| WO | WO 02/00551 A2 | 1/2002 |
| WO | WO 03/008071 A1 | 1/2003 |
| WO | WO 03/054508 A2 | 7/2003 |
| WO | WO 03/068685 A1 | 8/2003 |
| WO | WO 2004/041731 A1 | 5/2004 |
| WO | WO 2004/094043 A2 | 11/2004 |
| WO | WO 2004/098740 A2 | 11/2004 |
| WO | WO 2005/078836 A2 | 8/2005 |
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/071633 A1 | 6/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |

| WO | WO 2008/142017 A2 | 11/2008 |
| WO | WO 2008/142025 A2 | 11/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/036087 A1 | 3/2009 |
| WO | WO 2009/039655 A1 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/039903 A1 | 4/2010 |
| WO | WO 2010/039909 A1 | 4/2010 |

OTHER PUBLICATIONS

Perkins, S. "Sea Change: Carbon Dioxide Imperils Marine Ecosystems." Science News, v166, n3 , p. 35(1), Jul. 17, 2004.*

Gregerson, John. "Conquering Corrosion (in concrete)." Building Design & Construction, v40 , n8 , p. 50, Aug. 1999.*

"Technology for Commercialization of Slag." New Technology Japan, p. 35, Feb. 1995.*

Biello, D. Cement from CO2: A Concrete Cure for Global Warming? Scientific American Aug. 7, 2008., pp. 1-3 [online] [retrieved on Dec. 29, 2009] <URL: http://www.scientificamerican.com/article.cfm>.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Christiansen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

Huijgen, W.J.J., et al. 2005. Mineral CO2 Sequestration by Steel Slag Carbonation. Environ. Sci. Technol. 39: 9676-9682.

Huijgen, W.J.J., et al. 2006. Energy Consumption and Net CO2 Sequestration of Aqueous Mineral Carbonation. Ind. Eng. Chem. Res. 45: 9184-9194.

Huntzinger, D.N. et al. 2009. A life-cycle assessment of Portland cement manufacturing: comparing the traditional process with alternative technologies. Journal of Cleaner Production. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mm.edu/~dnhuntzi/DNHuntzingerETD.pdf>.

International Search Report dated Jan. 4, 2010 of PCT/US09/062795.

International Search Report dated Jan. 13, 2010 of PCT/US09/059135.

International Search Report dated Feb. 2, 2010 of PCT/US09/059141.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Sethi, S. et al. 2006. Existing & Emerging Concentrate Minimization & Disposal Practices for Membrane Systems. Florida Water Resources Journal. pp. 38, 40, 42, 44, 46, 48.

Stanley, S.M., et al. 2002. Low-magnesium calcite produced by corallin algae in seawater of Late Cretaceous composition. PNAS. 99(24): 15323-15326.

U.S. Appl. No. 12/163,205, filed Jun. 27, 2008, Constantz, Brent R., et al, Non-Final Office Action dated Jan. 27, 2010.

U.S. Appl. No. 12/344,019, filed Dec. 24, 2008, Constantz, Brent R., et al, Non-Final Office Action dated Nov. 16, 2009.

Wang, W., et al. 2005. Effects of biodegradation on the carbon isotopic composition of natural gas—A case study in the bamianhe oil field of the Jiyang Depression, Eastern China. Geochemical Journal. 39(4): 301-309. (abstract) [online] [retrieved on Dec. 29, 2009] <URL: http://www/jstage.jst.go.jp/article/geochemj/39/4/39_301/_article> ab.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Allen, L.M. 1992. Boron and Sulfur Isotopic Fractionation in the Coal Combustion System. A Thesis Submitted to the Faculty of the Department of Hydrology and Water Resources. The University of Arizona.

Baer, D.S., et al. 2002. Sensitive absorption measurements in the near-infrared region using off-axis integrated-cavity-output spectroscopy. Appl. Phys. B. 5 pages.

Biennier, L., et al. 2004. Multiplex integrated cavity output spectroscopy of cold PAH cations. Chemical Physics Letters. 387: 287-294.

Bottomley, D.J. et al. 1999. The origin and evolution of Canadian Shield brines: evaporation or freezing of seawater? New lithium isotope and geochemical evidence from the Slave craton. Chemical Geology. 155: 295-320.

Cerling, T.E. 1984. The stable isotopic composition of modern soil carbonate and its relationship to climate. Earth and Planetary Science Letters. 71: 229-240.

Criss, R.E. 1995. Stable Isotope Distribution: Variations from Temperature, Organic and Water-Rock Interactions. Washington University, St. Louis, Department of Earch and Planetary Sciences. American Geophysical Union. pp. 292-307.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. Applied Geochemistry. 22: 2065-2077.

Fallick, A.E., et al. 1991. A Stable Isotope Study of the Magnesite Deposits Associated with the Alpine-Type Ultramafic Rocks of Yugoslavia. Economic Geology. 86: 847-861.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). Journal of Sedimentary Research. 70(3): 565-585.

Holdgate, G.R., et al. 2009. Eocene-Miocene carbon-isotope and floral record from brown coal seams in the Gippsland Basin of southeast Australia. Global and Planetary Change. 65: 89-103.

Horkel, K., et al. 2009. Stable isotopic composition of cryptocrystalline magnesite from deposits in Turkey and Austria. Geophysical Research Abstracts. 11. (abstract only).

Horner, G. et al. 2004. Isotope selective analysis of CO2 with tunable diode laser (TDL) spectroscopy in the NIR. The Analyst. 129: 772-778.

International Search Report dated Mar. 3, 2010 of EP08867440.3.

International Search Report dated Feb. 24, 2010 of PCT/US09/067764.

International Search Report dated Mar. 10, 2010 of PCT/US10/022935.

McCrea, J.M. 1950. On the Isotopic Chemistry of Carbonates and a Paleotemperature Scale. The Journal of Chemical Physics. 18(6): 849-857.

Melezhik, V.A., et al. 2001. Palaeoproterozoic magnesite: lithological and isotopic evidence for playa/sabkha environments. Sedimentology. 48: 379-397.

Mihalcea, R.M., et al. 1998. Diode-laser absorption measurements of CO2 near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

O'Neil, J.R., et al. 1971. C13 and O18 compositions in some freshwater carbonates associated with ultramafic rocks and serpentines: western United States*. *Geochimica et Cosmochimica Acta*. 35: 687-697.

Philp, R.P. 2007. The emergence of stable isotopes in environmental and forensic geochemistry studies: a review. *Environ Chem Lett*. 5:57-66.

Power, I.M., et al. 2007. Biologically induced mineralization of dypingite by cyanobacteria from an alkaline wetland near Atlin, British Columbia, Canada. *Geochemical Transactions*. 8: 16 pages.

Saad, N. et al. 2009. Measurement of Isotopic CO2 in Dissolved Inorganic Carbons of Water Samples from Various Origins Using Wavelength-Scanned Cavity Ring-Down Spectrophotometer. *Geophysical Research Abstracts*. 11. (abstract only).

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol*. 26. 161-198.

Sial, A.N., et al. 2000. Carbon isotope fluctuations in Precambrian carbonate sequences of several localities in Brazil. *An. Acad. Bras. Ci*. 72(4): 539-558.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz. et al, Non-Final Office Action dated Mar. 12, 2010.

U.S. Appl. No. 12/604,383, filed Oct. 22 2009, Constantz Brent R. et al, Non-Final Office Action dated Apr. 5, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. *Plenum*.

Webber, M.E., et al. 2001. In situ combustion measurements of CO2 by use of a distributed-feedback diode-laser sensor near 2.0 μm. *Applied Optics*. 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc*. 104: 95-112.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

"Electrochemical cell", Wikipedia (2009), http:en.wikipedia.org/wiki/Electrochemical_Cell, Nov. 24, 2009, 5 pp.

International Search Report dated Dec. 14, 2009 of PCT/US09/061748.

"Isotopic Signature", Wikipedia (2010), http://en.wikipedia.org/wiki/Isotopic_signature, Apr. 14, 2009, 3 pp.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia. Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union* Abstract #U22A-07.

Cannell, M.G.R. 2003. "Carbon sequestration and biomass energy offset: theoretical, potential and achievable capacities globally, in Europe and the UK." Biomass and Bioenergy. 24: 97-116.

CICCS "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp, Jun. 2009.

Graff "Just Catch—CO2 Capture Technology" Aker Kvaerner; Pareto Clean Energy Tech Seminar Oct. 11, 2007 25pp, Mar. 18, 2006.

Green Car Congress "PKU Researchers Carry Out Aqueous Fischer-Tropsch Reaction for First Time"; www.greeencarcongress.com/2007/12/pku-researchers.html; Dec. 12, 2007; 2pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. Chem. Eng. Technol. 17: 382-389.

Huijgen, W.J.J., et al. 2003. Carbon dioxide sequestration by mineral carbonation. ECN-C03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10 pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Mazrou, S., et al. 1997. Sodium hydroxide and hydrochloric acid generation from sodium chloride and rock salt by electro-electrodialysis. Journal of Applied Electrochemistry 27: 558-567.

Montes-Hernandez, G. et al.,"Mineral sequestration of CO2 by aqueous carbonation of coal combustion fly-ash."Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration By Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12 pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, A., et al. 2004. CO2 mineral sequestration: physically activated dissolution of serpentine and pH swing process. Chemical Engineering Science 59 (22-23): 5241-5247.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. Energy Conversion and Management. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Sadhwani et al., "Case Studies on environmental impact of seawater desalination" Science Direct; http://www.sciencedirect.com/science?_ob=ArticleURL&_udi=B6TFX-4HMX97J-3&_u... 3pp, Nov. 2005.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); Feb. 2003 www.shellglobalsoultions.com 2 pp.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009, Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70: 483-497.

* cited by examiner

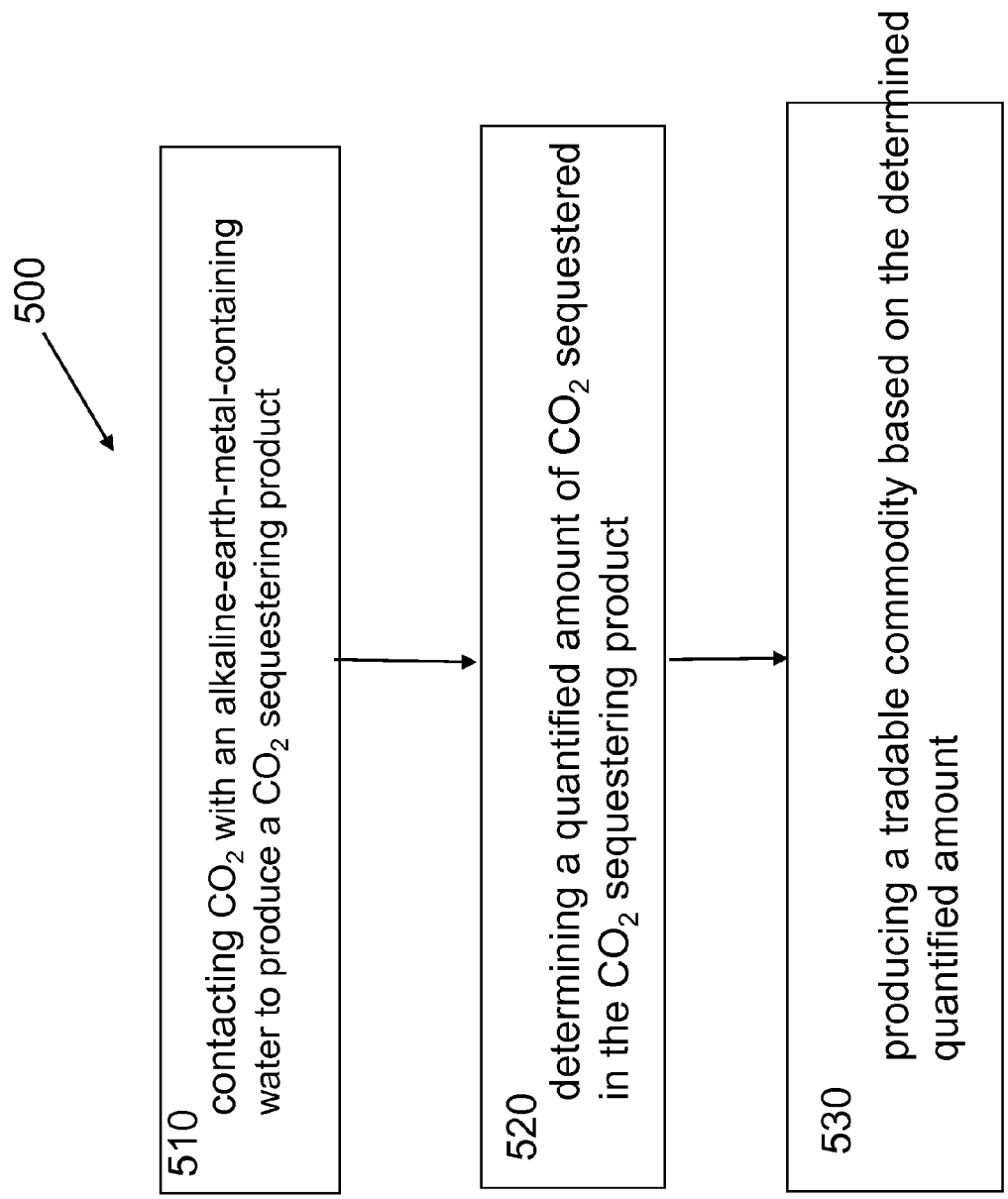

US 7,966,250 B2

$CO_2$ COMMODITY TRADING SYSTEM AND METHOD

CROSS-REFERENCE TO RELATED APPLICATIONS

This patent application claims priority under CFR 1.78 (4) and (5) to U.S. Provisional Patent Application No. 61/096,035 filed on Sep. 11, 2008, titled: "METHODS OF PRODUCING CARBON SEQUESTRATION TRADABLE COMMODITIES, AND SYSTEMS FOR TRANSFERRING THE SAME", herein incorporated by reference in its entirety; U.S. Provisional Patent Application No. 61/101,629 filed on Sep. 30, 2008, titled: "METHODS OF PRODUCING CARBON SEQUESTRATION TRADABLE COMMODITIES, AND SYSTEMS FOR TRANSFERRING THE SAME", herein incorporated by reference in its entirety; and U.S. Provisional Patent Application No. 61/117,541 filed on Nov. 24, 2008, titled: "METHODS OF PRODUCING CARBON SEQUESTRATION TRADABLE COMMODITIES, AND SYSTEMS FOR TRANSFERRING THE SAME", herein incorporated by reference in its entirety.

BACKGROUND OF THE INVENTION

Carbon dioxide ($CO_2$) and other greenhouse gas (GHG) emitted from industrial plants, e.g., fossil fuelled electrical power generating plants, cement production plants and ore processing plants, have been identified as a major cause of global climate change. Consequently, it is very desirable to reduce and manage GHGs emission from these and other sources.

SUMMARY OF THE INVENTION

In various embodiments, this invention pertains to a method and system of generating and trading a $CO_2$ commodity that is correlated to a quantified amount of $CO_2$ sequestered in a $CO_2$ sequestering product. The invention also pertains to a computer-implemented method and system of generating and trading the $CO_2$ commodity, and a program product comprising embedded instructions for causing the computer system to generate and trade the $CO_2$ commodity. The invention also pertains to the tradable $CO_2$ commodity.

In various embodiments, the system comprises a computer-implemented system of trading a $CO_2$ commodity, comprising: a $CO_2$ sequestration converter that is programmed to convert a quantified amount of $CO_2$ sequestered in a $CO_2$ sequestering product into a tradable commodity. In various embodiments, the $CO_2$ sequestering product comprises a carbonate or bicarbonate, comprising calcium and/or magnesium. The tradable commodity in various embodiments comprises a tradable instrument comprising a $CO_2$ emission certificate, a $CO_2$ emission permit, a $CO_2$ emission credit, a carbon offset, carbon allowance, or a criteria pollutant allowance. In some embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

In various embodiments of the system, a $CO_2$ sequesterer or a $CO_2$ regulator issues the tradable commodity; in some embodiments, the $CO_2$ sequesterer issues the tradable commodity based on the quantified amount of $CO_2$ in the $CO_2$ sequestration product; in some embodiments, the $CO_2$ regulator issues the tradable commodity based on the amount of $CO_2$ in the environment; in some embodiments, a $CO_2$ generator, a $CO_2$ trader or the $CO_2$ sequesterer acquires the tradable commodity.

In another embodiment of the system, the tradable commodity permits the holder to emit a restricted amount of $CO_2$; in various embodiments, the tradable commodity is valid for a limited time. In various embodiments, the tradable commodity is priced based on the supply and demand for the tradable commodity in a commodity market; in other embodiments, the tradable commodity is priced based on the amount of $CO_2$ in the environment.

In another embodiment of the system, the $CO_2$ generator is correlated to a $CO_2$ emitting facility such as an electrical power generating plant, a cement producing plant or an ore processing plant that emits $CO_2$; in some embodiments, the $CO_2$ generator, the $CO_2$ sequesterer and the $CO_2$ trader comprise a single entity. In some embodiments, the $CO_2$ sequesterer or the $CO_2$ generator may transfer the tradable commodity to a third party; in some embodiments, the $CO_2$ sequesterer or the $CO_2$ to generator may retire the tradable commodity.

In various embodiments of the system, the source of the $CO_2$ sequestered in the $CO_2$ sequestering product is determined by measuring the $^{13}C$ isotopic content of carbon sequestered in the $CO_2$ sequestering product and correlating this measurement to $CO_2$ emitted from a facility that burns fossil fuels. In various embodiments, the $CO_2$ sequestered in the $CO_2$ sequestering product is quantified by measuring the $CO_2$ sequestered in the $CO_2$ sequestration product.

In some embodiments of the system, the $CO_2$ generator may issue instructions for paying a tipping fee to the $CO_2$ sequesterer for sequestering criteria pollutants with the $CO_2$; in other embodiments, the $CO_2$ sequestration converter may estimate the carbon emission footprint of a particular $CO_2$ emitter.

In some embodiments, the system is configured to perform any of the following functions: receive payment for the tradable commodity; issue a receipt for purchase of the tradable commodity; or manage the inventory of tradable commodity. In various embodiments, the system comprises a computer network that is programmed to implement the system and method.

In another embodiment, the system comprises a $CO_2$ commodity trading system, comprising a $CO_2$ sequesterer that sequesters $CO_2$ into a $CO_2$ sequestering product; and a $CO_2$ sequestration converter that quantify the sequestered $CO_2$ into a tradable commodity. In various embodiments, the $CO_2$ sequesterer comprises a system configured to contact $CO_2$ with a divalent cation solution to produce a solid, stable $CO_2$ sequestering product. In various embodiments, the $CO_2$ sequestering product comprises a carbonate or bicarbonate comprising calcium or magnesium.

In various embodiments of the system, the $CO_2$ sequestration converter comprises a system configured to determine the amount of $CO_2$ sequestered in the $CO_2$ sequestering product, and produce the tradable commodity. In some embodiments, the $CO_2$ sequesterer may issue the tradable commodity based on the amount of $CO_2$ quantified in the $CO_2$ sequestration product, or the tradable commodity is issued based on the amount of $CO_2$ in the environment.

In some embodiments of the system, a $CO_2$ generator or the $CO_2$ sequesterer may acquire the tradable commodity. In some embodiments, the tradable commodity is valid for a permitted amount of $CO_2$ emissions; and the tradable commodity is valid for a limited time. In other embodiments, the tradable commodity is priced based on the supply and demand for the tradable commodity in a commodity market;

in some embodiments, the tradable commodity is priced based on the amount of $CO_2$ in the environment.

In some embodiments of the system, the $CO_2$ generator comprises a $CO_2$ emitting facility, e.g., a fossil fuelled electrical power generating plant, a cement producing plant or an ore processing plant. In some embodiments, the $CO_2$ generator, the $CO_2$ sequesterer and the $CO_2$ trader comprise a single entity; in some embodiments, the $CO_2$ sequesterer or the $CO_2$ generator may transfer the tradable commodity to a third party; and the $CO_2$ sequesterer or the $CO_2$ generator may retire the tradable commodity.

In various embodiments of the system, the source of the $CO_2$ sequestered in the $CO_2$ sequestering product is determined by measuring the $^{13}C$ isotopic content in the $CO_2$ sequestering product and correlating this measurement to $CO_2$ emissions from combusting fossil fuels. In various embodiments, the $CO_2$ sequestered in the $CO_2$ sequestering product is quantified by chemically measuring the $CO_2$ sequestered in the $CO_2$ sequestration product. In some embodiments, the $CO_2$ generator may pay a tipping fee to the $CO_2$ sequesterer for sequestering criteria pollutants with the $CO_2$; in other embodiments, the $CO_2$ sequestration converter may estimate a carbon emission footprint.

In various embodiments, the system may perform any of the following functions: receive payment for the tradable commodity; issue a receipt for purchase of the tradable commodity; or manage the inventory of tradable commodity. In various embodiments, the system comprises a computer network.

In one embodiment, the computer program product comprises a computer installable medium comprising computer readable code embodied therein for causing a computer to execute a program module, comprising: a $CO_2$ sequestration converter that is programmed to convert a quantified amount of $CO_2$ sequestered in a $CO_2$ sequestering product into a tradable commodity. In various embodiments, the $CO_2$ sequestration converter comprises computer-executable instructions for receiving data comprising sequestered $CO_2$; calculating a quantity of tradable commodity based on the sequestered $CO_2$; and issuing instructions for producing the tradable commodity.

In other embodiments of the program product, the tradable commodity is valid for a permitted amount of $CO_2$ emissions; in some embodiments, the tradable commodity is valid for a limited time. In various embodiments, the tradable commodity is priced based on the supply and demand for the tradable commodity in a commodity market; in other embodiments, the tradable commodity is priced based on the amount of $CO_2$ in the environment. In various embodiments of the program product, the $CO_2$ sequesterer or the $CO_2$ generator is programmed to transfer the tradable commodity to a third party; in some embodiments, the $CO_2$ sequesterer or the $CO_2$ generator is programmed to retire the tradable commodity. In some embodiments, the $CO_2$ generator is programmed to issue instructions for paying a tipping fee to the $CO_2$ sequesterer for sequestering criteria pollutants with the $CO_2$; in some embodiments, the $CO_2$ sequestration converter is programmed to estimate a carbon emission footprint. In various embodiments, the system is configured to execute any of the following functions: receive payment for the tradable commodity; issue a receipt for purchase of the tradable commodity; or manage the inventory of tradable commodity; and the program is installed in a computer network.

In another embodiment of the invention, the tradable $CO_2$ commodity is correlated to a quantified amount of $CO_2$ sequestered in a $CO_2$ sequestering product, wherein the $CO_2$ is sequestered as a carbonate or bicarbonate comprising calcium and/or magnesium. In various embodiments, the tradable commodity comprises a tradable instrument comprising: a $CO_2$ emission certificate, a $CO_2$ emission permit, a $CO_2$ emission credit, a carbon offset, carbon allowance, or a criteria pollutant allowance. In various embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

In various embodiments, the tradable commodity is useable to authorize an emission of a permitted amount of $CO_2$. In other embodiments, the tradable commodity is useable to authorize $CO_2$ emissions for a limited time. In some embodiments, the tradable commodity is priced based on the amount of $CO_2$ in the environment. In some embodiments, the tradable commodity is based on $CO_2$ emissions from a $CO_2$ emitting facility. In some embodiments, the $CO_2$ emitting facility comprises an electrical power generating plant, a cement producing plant or an ore processing plant. In various embodiments, the amount and/or source of the $CO_2$ is determined by measuring the $^{13}C$ isotope in the $CO_2$ sequestration product. In some embodiments, the tradable commodity is based on a tipping fee paid by the $CO_2$ emitting facility to the $CO_2$ sequesterer for sequestering criteria pollutants with the $CO_2$.

In another embodiment, the method pertains to producing a $CO_2$ commodity, comprising: sequestering $CO_2$ in a $CO_2$ sequestering product; and quantifying the sequestered $CO_2$ into a tradable commodity. In various embodiments, the $CO_2$ sequestering product comprises a carbonate or bicarbonate comprising calcium and/or magnesium. In various embodiments, the tradable commodity comprises a tradable instrument comprising: a $CO_2$ emission certificate, a $CO_2$ emission permit, a $CO_2$ emission credit, a carbon offset, carbon allowance, or a criteria pollutant allowance. In various embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee. In various embodiments, a $CO_2$ sequesterer or a $CO_2$ regulator issues the tradable commodity. In various embodiments, the $CO_2$ sequesterer issues the tradable commodity based on the amount of $CO_2$ quantified in the $CO_2$ sequestration product; in various embodiments, the $CO_2$ regulator issues the tradable commodity based on the amount of $CO_2$ in the environment; in various embodiments, a $CO_2$ generator, a $CO_2$ trader or the $CO_2$ acquires the tradable commodity. In various embodiments, the tradable commodity is valid for a permitted amount of $CO_2$ emissions; and the tradable commodity is valid for a limited time. In various embodiments, pricing of the tradable commodity is based on the supply and demand for the tradable commodity in a commodity market; in various embodiments, the pricing of the tradable commodity is based on the amount of $CO_2$ in the environment. In various embodiments, the tradable commodity is correlated to $CO_2$ emissions by a $CO_2$ emitting facility comprising an electrical power generating plant, a cement producing plant or an ore processing plant. In various embodiments, the $CO_2$ sequesterer or the $CO_2$ generator retires the tradable commodity. In various embodiments, the amount and/or source of the $CO_2$ is determined by measuring the $^{13}C$ isotope in the $CO_2$ sequestration product. In various embodiments, the $CO_2$ generator pays a tipping fee to the $CO_2$ sequesterer for sequestering criteria pollutants with the $CO_2$. In various embodiments, the method further comprises: receiving payment for the tradable commodity; issuing a receipt for purchase of the tradable commodity; and managing the inventory of tradable commodity.

In another embodiment, the method pertains to a computer-implemented method of generating a tradable instrument, comprising: calculating a quantity of $CO_2$ sequestration commodity corresponding to $CO_2$ sequestered is an $CO_2$ sequestering product; and issuing the carbon sequestration commodity. In various embodiments, the $CO_2$ sequestering product comprises a carbonate and/or bicarbonate comprising calcium and/or magnesium.

In another embodiment, the method of producing the $CO_2$ commodity comprises: contacting $CO_2$ with an alkaline-earth-metal-containing water to produce a carbonate containing $CO_2$ sequestering product; determining a quantified amount of $CO_2$ sequestered in the $CO_2$ sequestering product; and producing a tradable commodity based on the determined quantified amount. In various embodiments, the tradable commodity is transferred to a customer. In some embodiments, the customer provides the $CO_2$.

In another embodiment, the system pertains to a computer-implemented system of trading a $CO_2$ commodity, comprising: (a) a communication module comprising: (i) an input manager for receiving commodity request information and payment from a customer; iii) an output manager for providing a tradable commodity to a user; and (iv) a user interface manager for transferring information about tradable commodities between a user and the system; and (b) a processing module configured to execute transactions with a customer, wherein the processing module is configured to provide at least one of the following features: a transfer manager configured to transfer commodities to a customer; an inventory manager configured to register changes to the inventory of tradable commodities available for transfer; or a receipt manager configured to receive payment from a customer and issue a receipt to said customer indicating a successful transaction. In various embodiments, the tradable commodity represents a quantified amount of $CO_2$ sequestered in a $CO_2$ sequestering product.

In various embodiments, the system involves transferring the tradable commodity to a customer. In some embodiments, the customer is a provider of the $CO_2$. In yet other embodiments, the customer is not a provider of the $CO_2$. In some embodiments, the method involves receiving consideration from the customer.

In another embodiment, the method comprises: generating $CO_2$; forwarding the $CO_2$ to a $CO_2$ sequesterer that: (i) contacts the $CO_2$ with an alkaline-earth-metal-containing water to produce a carbonate containing $CO_2$ sequestering product; (ii) determines a quantified amount of $CO_2$ sequestered in the $CO_2$ sequestering product; and (iii) produces a carbon sequestration tradable commodity based on the determined quantified amount; and receiving the carbon sequestration tradable commodity from the $CO_2$ sequesterer. In certain embodiments, the method involves transferring consideration to the $CO_2$ sequesterer.

In another embodiment, the system comprises computer system connected to the Internet and comprising software configured to communicate with a customer wherein a tradable commodity obtained by to contacting $CO_2$ with an alkaline-earth-metal-containing water to obtain a $CO_2$ sequestering product may be transferred to the customer. In some embodiments, the customer is in communication with a $CO_2$ commodity exchange, and the system is configured to transfer consideration to a $CO_2$ sequesterer that sequesters the $CO_2$ in the $CO_2$ sequestering product.

Advantageously, with the present system and method, by sequestering $CO_2$ in a $CO_2$ sequestering product and quantifying the sequestered $CO_2$ to a tradable commodity that can be traded in a commodity exchange market between a $CO_2$ generator and a $CO_2$ sequesterer, the $CO_2$ generator is provided with increased flexibility in managing $CO_2$ emissions

BRIEF DESCRIPTION OF THE DRAWINGS

The following drawings illustrate by examples and not by limitation embodiments of the present system and method.

FIG. 5 is an illustration of an embodiment of a method for obtaining tradable commodities.

DETAILED DESCRIPTION OF THE INVENTION

Figure 1:
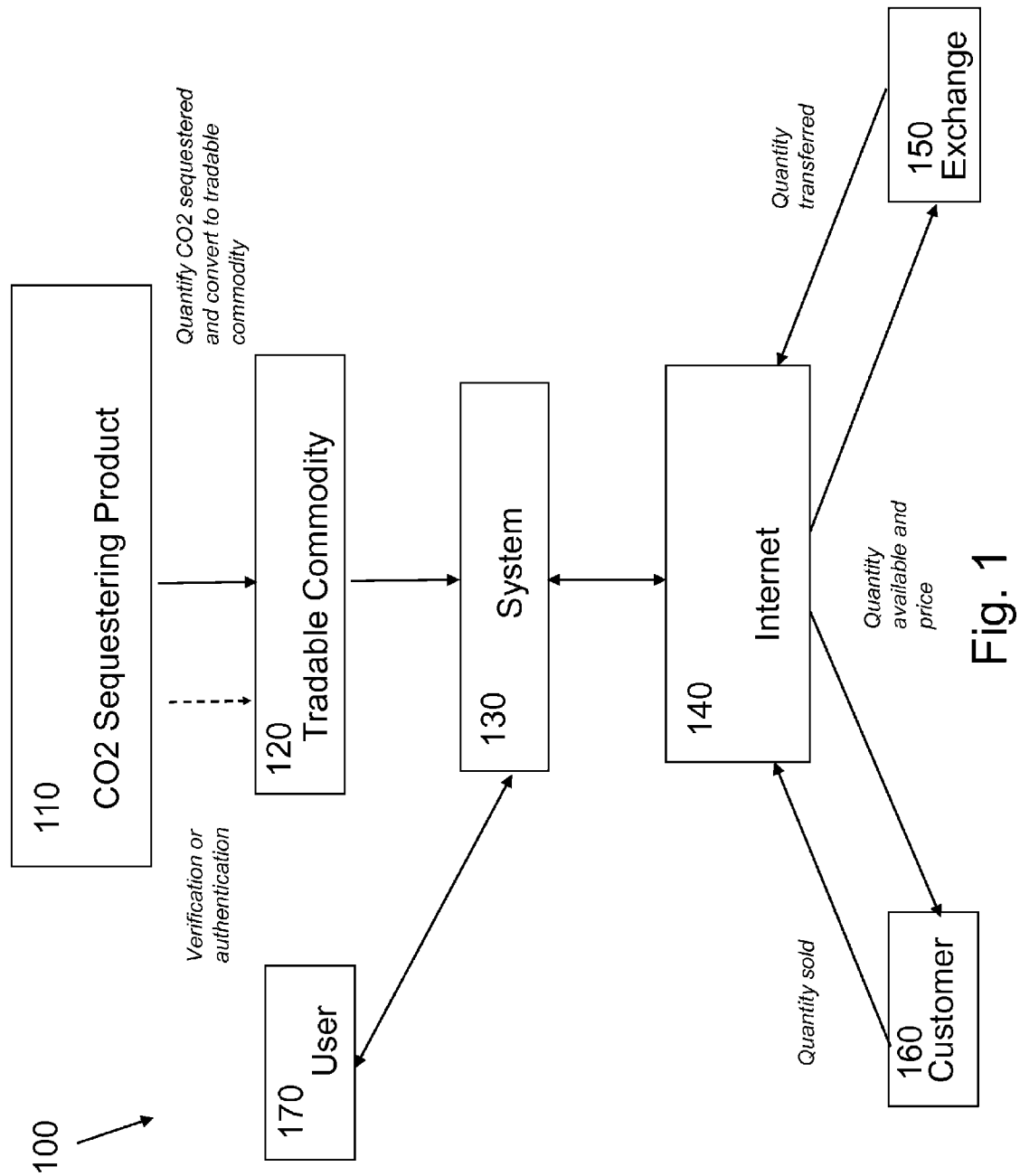
FIG. 1 is an illustration of an embodiment of the system for trading the commodities.

In the following detailed description, the general market for a tradable $CO_2$ commodity is first described. Thereafter, a method and system of producing the $CO_2$ sequestering product are described. Next, methods of determining the $CO_2$ sequestered in the $CO_2$ sequestering product are described. Thereafter, methods and system of converting the sequestered $CO_2$ to a tradable $CO_2$ commodity are described. Next, methods and system of transferring the tradable $CO_2$ commodity to a customer are described. Thereafter, the $CO_2$ generator and $CO_2$ sequesterer are described. Next, systems and methods of transferring the tradable $CO_2$ commodity are described, including a system of trading a related commodity.

The $CO_2$ Commodity Market

In recent years, several national and international markets for trading a GHG commodity have emerged in response to governmental regulations of GHG emissions. In these markets, although the details of their operation varies, in practice the objective is the same, which is to provide a means for participants to comply with legislation by allowing them to trade in a commodity that corresponds to the emission of a certain amount of GHGs. Thus, for example, as an incentive to limit $CO_2$ emissions, in January 2005, the European Union (EU) member states implemented a mandatory carbon market, the EU Emissions Trading Scheme (EU ETS), for its members. Similarly, in North America, the establishment of the Chicago Climate Exchange (CCX) has illustrated the viability of a voluntary carbon trading market for corporations that emit GHGs.

Also in recent years, the concept of "carbon neutrality" has become increasingly popular among companies and individuals. "Carbon neutrality" is based on the idea that an entity should directly bear the cost of its carbon emissions, i.e., "offset" its emissions, rather than allowing those emissions to become an externality of its operations. Thus, while some companies have joined the CCX to trade in carbon credits, others are offsetting their carbon emissions by purchasing carbon offsets. These purchases can be done on an "over the counter" (OTC) market place, such as CCX, or on a one to one basis between private parties, or between an intermediary, who would represent an offset generator, and another party interested in purchasing this offset. Likewise, individuals and families, are increasingly offsetting their emissions by purchasing an offset. An average individual in the United States, for example, can offset his/her own personal GHG "footprint" for about $100-$200 per year. In 2007, it is estimated that the OTC market was worth $258.4 million, greater than four times its value in 2006 ($58.5 million).

In other instances, governments that have committed to reducing GHG emissions under the Kyoto Protocol have also implemented a market-based GHG regulating system, e.g., the ETS regulations of the EU member states as noted above, and the project-based regulation system of the Clean Development Mechanism (CDM) or the Joint Implementation plan (JI). However, it should be noted that these latter two markets, although regulated, are also part of the voluntary market as they are not constrained by a cap and trade regulation; also, some developed countries volunteer to invest in the developing countries via these markets. Generally, however, as these regulatory systems are implemented by law, they are considered "regulated markets" as distinct from the "voluntary" OTC offsets and CCX markets.

In the various GHG commodity markets, due to subtle differences between the units used to quantify the GHG, the units are not completely fungible. Thus, for example, under the CCX or EU ETS, companies are allocated and can later trade "allowances." An allowance permits a company to emit a certain amount of $CO_2$ (usually measured in units of carbon dioxide equivalents, or $CO_2e$'s). By contrast, the OTC market relies to on project-based offsets. Purchasing a project-based offset means that a company has paid for a project that will reduce $CO_2$ emitted in an amount corresponding to the value of the offset. As a result, OTC offsets may not be traded in a secondary market; however, offsets may be traded on secondary markets if they are not sold OTC and are instead converted into tradable units.

Notwithstanding their differences, there are commonality among them, e.g., between the offset system and the allowance system. Thus, for example, CDM and JI projects are examples of tradable project-based offsets that satisfy Kyoto standards and which may be converted into European Union Allowances (EUAs). Similarly, the CCX may issue Carbon Financial Instruments (CFIs) to project-based offsets. All offsets, however, are not equal, e.g., the CDM and JI offsets require a much greater level of scrutiny to garner approval than most OTC offsets, such as Verified Emission Reductions (VERs), available in the United States.

Offsets are inherently intangible commodities and, accordingly, an offset's "quality" varies widely by seller. For example, one offset provider may plant a tree and sell offsets based on the expected future atmospheric carbon dioxide reduction capacity of the tree over its lifetime, but will fail to monitor the actual carbon dioxide disposal of the tree, or even the tree's survival, in the future. In some instance, the same offset provider may sell the entirety of the potential offsets provided by that tree today regardless of how long it lives. By contrast, another offset provider may have developed a new method for disposing of carbon dioxide, where the exact quantity of carbon dioxide sequestered is monitored over time, and offsets are only sold once the carbon dioxide has already been disposed. Thus, the value of one offset may be of substantially higher quality than another offset.

In various markets, the concept of "additionality" is an indicator of the quality of the offset. For example, if a project has additionality, it means that that the sole motivation for engaging in the project that generates the offset is the very generation of the offset itself; that is, the project would not have occurred but for the incentive of offset generation. Thus, offsets based on the $CO_2$ reduction from trees sold by an environmentalist that would have planted trees without the offset incentive would be considered low-quality offsets.

Producing the $CO_2$ Sequestering Product

Embodiments of the invention include producing a carbon sequestration tradable commodity by first producing a $CO_2$ sequestering product. As such, embodiments of the invention include first producing $CO_2$ sequestering products, and then producing tradable commodities based on the $CO_2$ sequestering products that are produced, e.g., deriving or calculating tradable commodities from the amount of $CO_2$ that is sequestered in the $CO_2$ sequestering products. The steps of producing a $CO_2$ sequestering product and then deriving a tradable commodity therefrom are described separately in greater detail below.

As summarized above, a first step in various embodiments of the method is to sequester an amount of $CO_2$ in a $CO_2$ sequestration product. $CO_2$ sequestration procedures include, but are not limited to, those disclosed in U.S. patent application Ser. Nos. 12/126,776 and 12/163,205; as well as pending U.S. Provisional Patent Application Ser. Nos. 61/017,405; 61/017,419; 61/057,173; 61/056,972; 61/073,319; 61/079,790; 61/081,299; 61/082,766; 61/088,347 and 61/088,340, the disclosures of which are herein incorporated by reference in their entirety.

$CO_2$ sequestering products of the invention include carbonate compositions that may be produced by precipitating a calcium and/or magnesium carbonate composition from water, e.g., a divalent cation solution comprising calcium and/or magnesium ions. In some embodiments, the $CO_2$ sequestering products comprises other carbonates and/or bicarbonates such as sodium and potassium carbonate and or bicarbonates. In other embodiments the $CO_2$ sequestering product comprises a solution and/or a slurry of the carbonates and/or bicarbonates. The carbonate compound compositions that make up the $CO_2$ sequestering products of the invention include metastable carbonate compounds that may be precipitated from a water, such as a salt-water, as described in greater detail below. In other embodiments, the carbonate compound compositions of the invention include precipitated crystalline and/or amorphous carbonate compounds.

In certain embodiments, the solution from which the carbonate precipitates are produced comprises a saltwater. Hence, in these embodiments, the carbonate compound composition may be viewed as a saltwater derived carbonate compound composition. As used herein, "saltwater-derived carbonate compound composition" means a composition derived from saltwater and made up of one or more different carbonate crystalline and/or amorphous compounds with or without one or more hydroxide crystalline or amorphous compounds. The term "saltwater" is employed in its conventional sense to refer to a number of different types of aqueous liquids other than fresh water, where the term "saltwater" includes brackish water, sea water and brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt. The saltwater source from which the mineral composition of the invention is derived may be a naturally occurring source, such as a sea, ocean, lake, swamp, estuary, lagoon, etc., or a man-made source. In certain embodiments, the saltwater source of the mineral composition is seawater or a naturally occurring brine.

While the present invention is described in some embodiments in terms of saltwater sources, in certain embodiments, the water employed in the invention may be a mineral rich, e.g., calcium and/or magnesium rich, freshwater source. The water employed in the process is one that includes one or more alkaline earth metals, e.g., magnesium, calcium, etc, and is another type of alkaline-earth-metal-containing water that finds use in embodiments of the invention. Other examples of suitable water include those that comprises calcium in amounts ranging from 50 to 20,000 ppm, such as 100 to 10,0000 ppm and including 200 to 5000 ppm. Waters of interest include those that include magnesium in amounts ranging from 50 to 20,000 ppm, such as 200 to 10000 ppm and including 500 to 5000 ppm.

In some embodiments, the saltwater-derived carbonate compound compositions are derived from a saltwater. As such, they are compositions that are obtained from a saltwater in some manner, e.g., by treating a volume of a saltwater in a manner sufficient to produce the desired carbonate compound composition from the initial volume of saltwater. The carbonate compound compositions of certain embodiments are produced by precipitation from a water, e.g., a saltwater, a water that includes alkaline earth metals, such as calcium and magnesium, etc., where such waters are collectively referred to as alkaline-earth-metal-containing waters.

The saltwater employed in methods may vary. As reviewed above, saltwater of interest include brackish water, sea water and brine, as well as other salines having a salinity that is greater than that of freshwater (which has a salinity of less than 5 ppt dissolved salts). In some embodiments, calcium rich waters may be combined with magnesium silicate minerals, such as olivine or serpentine, in solution that has become acidic due to the addition of carbon dioxide to form carbonic acid, and/or the addition of an exogenous acid such as hydrochloric acid produced in an electrochemical process, which dissolves the magnesium silicate, leading to the formation of calcium magnesium silicate carbonate compounds as mentioned above.

In methods of producing a precipitated carbonate compound composition of the invention, a volume of water is subjected to carbonate compound precipitation conditions sufficient to produce a precipitated carbonate compound composition and a mother liquor (i.e., the part of the water that is left over after precipitation of the carbonate compound(s) from the saltwater). The resultant precipitates and mother liquor collectively make up the carbonate compound compositions of the invention. Any convenient precipitation conditions may be employed, which conditions result in the production of a carbonate compound composition sequestration product.

Precipitation conditions may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitate.

In normal seawater, 93% of the dissolved $CO_2$ is in the form of bicarbonate ions ($HCO_3^-$) and 6% is in the form of carbonate ions ($CO_3^{-2}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level which minimizes if not eliminates $CO_2$ production during precipitation, causing dissolved $CO_2$, e.g., in the form of carbonate and bicarbonate, to be trapped in the carbonate compound precipitate. In these embodiments, the pH may be raised to 10 or higher, such as 11 or higher. In other embodiments, similar results are achieved with a brackish water or a naturally occurring brine.

The pH of the water may be raised using any convenient approach. In certain embodiments, a pH raising agent may be employed, where examples of such agents include oxides, hydroxides (e.g., calcium oxide in fly ash, potassium hydroxide, sodium hydroxide, brucite ($Mg(OH)_2$), etc.), carbonates (e.g., sodium carbonate) and the like. One such approach is to use the coal ash from a coal-fired power plant, which contains many oxides, to elevate the pH of seawater. Other coal processes, like the gasification of coal, to produce syngas, also produce hydrogen gas and carbon monoxide, and may serve as a source of hydroxide as well. Some naturally occurring minerals, such as serpentine, contain hydroxide, and can be dissolved, yielding a hydroxide source. The addition of serpentine, also releases silica and magnesium into the solution, leading to the formation of silica containing carbonate compounds. The amount of pH elevating agent that is added to the water will depend on the particular nature of the agent and the volume of saltwater being modified, and will be sufficient to raise the pH of the water to the desired value. Alternatively, the pH of the saltwater source can be raised to the desired level by electrolysis of the water. Where electrolysis is employed, a variety of different processes s may be taken, such as use of the Mercury cell process (also called the Castner-Kellner process); the Diaphragm cell process and the membrane cell process. Where desired, byproducts of the hydrolysis product, e.g., $H_2$, sodium metal, etc. may be harvested and employed for other purposes, as desired. In some embodiments, a low-voltage electrochemical process that requires a voltage of 2V or less or 1.5V or less my be used to remove protons from the solution directly and/or through the production of a base.

In yet other embodiments, the pH elevating approach as described in pending U.S. application Ser. Nos. 61/081,299 and 61/091,729 may be employed, the disclosures of which approaches are herein incorporated by reference.

Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$ that precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph.

Rate of precipitation also has a large effect on compound phase formation. The most rapid precipitation can be achieved by seeding the solution with a desired phase. Without seeding, rapid precipitation can be achieved by rapidly increasing the pH of the seawater, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from water includes, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The processes s employed to prepare carbonate compound precipitates according to the invention may be batch or continuous processes s. It will be appreciated that precipitation conditions may be different to produce a given precipitate in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of salt water is contacted with a source of $CO_2$ while the volume of saltwater is being subjected to carbonate compound precipitation conditions. Embodiments of the invention include methods in which the volume of water is contacted with a source of a $CO_2$ both prior to subjecting the volume of saltwater to carbonate compound precipitation conditions and while the volume of saltwater is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that is contacted with the volume of saltwater in these embodiments may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste feed from an industrial plant. The nature of the industrial plant may vary in these embodiments, where industrial plants of interest include power plants, cement production plants, ore processing plants, chemical processing plants, and other industrial plants that produce $CO_2$ as a byproduct. By waste feed is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Exhaust gases containing NOx, SOx, VOCs, particulates and Hg would commonly incorporate these compounds along with the carbonate in the precipitated product. Particular multi-component gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

The volume of water, e.g., saltwater may be contacted with the $CO_2$ source using any convenient process. Where the $CO_2$ is a gas, contact process include, but are not limited to: direct contacting processes, e.g., bubbling the gas through the volume of saltwater, concurrent contacting means, i.e., contact between unidirectional flowing gaseous and liquid phase streams, countercurrent means, i.e., contact between oppositely flowing gaseous and liquid phase streams, and the like. Thus, contact may be accomplished through the use of one or more of: infusers, bubblers, fluidic Venturi reactor, sparger, gas filter, spray, tray, or packed column reactors, or combinations thereof and the like, as may be convenient.

Production of the carbonate mineral precipitate as described above yields a carbonate compound composition (also referred to herein as $CO_2$ sequestering products), which includes precipitated carbonate solids suspended in the mother liquor. In some embodiments, the $CO_2$ sequestering product is an aqueous slurry or solution; in other embodiments, it is a precipitate, and in still others it is it is a combination of an aqueous solution and precipitate. In some embodiments, at least a part of the $CO_2$ sequestering product or all of the $CO_2$ sequestering product comprises a precipitate suitable for use in the built environment, e.g., a cement, a supplementary cementitious material, an aggregate or a combination thereof.

The $CO_2$ sequestering products produced by methods of the invention are derived from, e.g., precipitated from, a water (as described in greater detail below). As the $CO_2$ sequestering products are precipitated from water, they will include one or more components that are present in the water from which they are derived. For example, where the water is salt water, the $CO_2$ sequestering products will include one or more compounds found in the salt-water source. These compounds identify the solid precipitations of the compositions that come from the salt-water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements are generally present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. In certain embodiments, the calcium carbonate content is 25% w/w or higher, such as 40% w/w or higher, and including 50% w/w or higher, e.g., 60% w/w.

Following production of the $CO_2$ sequestering product, the product is disposed of in a manner sufficient to sequester the $CO_2$ that is present in the solid components of the product, e.g., present as carbonate compounds, etc. Disposal procedures may vary widely, and may include separation of the product from the mother liquor, treatment of the mother liquor, disposal in land or water, e.g., ocean/sea locations, or in subterranean locations and the like.

In certain embodiments, the $CO_2$ sequestering product is disposed of by simply locating it and the mother liquor at an above ground location using any convenient process, e.g., by transporting it to a suitable location, such as a tailing pond type structure, reservoir, etc, where the composition is placed and, over time, the liquid component may evaporate leaving precipitated solids. In these embodiments, the $CO_2$ sequestering product and mother liquor together make up a composition that includes one or more carbonate compounds. In certain embodiments, the compositions are thick suspensions of solid carbonate precipitates in an aqueous liquid, e.g., a slurry of carbonate compound precipitates in water. In certain embodiments, the viscosity of the carbonate compound slurry is 1 cp or more, such as 100 cp or more and including 1000 cp or more as determined at standard laboratory temperature and pressure conditions (i.e., 100 kPa, 25° C.) using the viscosity determination protocol as described in Handbook of Food Science, Technology, and Engineering, Vol. 4, Edited by Y. H. Hui. See e.g., United States Provisional Application Ser. No. 61/082,766; the disclosure of which is herein incorporated by reference.

In certain embodiments where the product and mother liquor are disposed of together, the flowable composition is disposed of in an underwater location. Underwater locations may vary depending on a particular application. While the underwater location may be an inland underwater location, e.g., in a lake, including a freshwater lake, of interest in certain embodiments are ocean or sea underwater locations. The underwater location may be shallow or deep. Shallow locations are locations which are 200 ft or less, such as 150 ft or less, including 1000 ft or less. Deep locations are those that are 200 ft or more, e.g., 500 ft or more, 1000 ft or more, 2000 ft or more, including 5000 ft or more.

Where desired, the compositions made up of the precipitate and the mother liquor may be stored for a period of time following precipitation and prior to disposal. For example, the composition may be stored for a period of time ranging from 1 to 1000 days or longer, such as 1 to 10 days or longer, at a temperature ranging from 1 to 40° C., such as 20 to 25° C.

Any convenient process for transporting the composition to the site of disposal may be employed, and will necessarily vary depending on the locations of the precipitation reactor and site of disposal relative to each other, whether the site of disposal is an above ground or below ground site of disposal, etc. In certain embodiments, a pipeline or analogous slurry conveyance structure is employed, where these approaches may include active pumping, gravitational mediated flow, etc., as desired. In yet other embodiments, cargo type transportation processes are employed, e.g., shipping via train, truck, barge, ship, etc.

While in certain embodiments the carbonate compound is directly disposed at the disposal site without further processing following precipitation, in yet other embodiments the composition may be further processed prior to disposal. For example, in certain embodiments solid physical shapes may be produced from the composition, where the resultant shapes are then disposed of at the disposal site of interest. One example of this embodiment is where artificial reef structures are produced from the carbonate compound compositions, e.g., by placing the flowable composition in a suitable mold structure and allowing the composition to solidify over time into the desired shape. The resultant solid reef structures may then be deposited in a suitable ocean location, e.g., a shallow underwater location, to produce an artificial reef, as desired.

Other embodiments may include treatment of the mother liquor to prior to disposal, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient processes, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient processes, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient processes. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feedwater for the methods of invention, e.g., an ocean or sea.

In certain embodiments, following production of the $CO_2$ sequestering product, the resultant product is separated from the mother liquor to produce separated $CO_2$ sequestering product. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate.

The resultant dewatered precipitate may then be dried, as desired, to produce a dried product. Drying can be achieved by air-drying the wet precipitate. Where the wet precipitate is air dried, air-drying may be at room or elevated temperature. In yet another embodiment, the wet precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying processes of the system, the drying station may include a filtration element, freeze drying structure, spray drying structure, etc. Where desired, the dewatered precipitate product may be washed before drying. The precipitate may be washed with freshwater, e.g., to remove salts (such as NaCl) from the dewatered precipitate.

The dried product may be disposed of or employed in a number of different ways. In certain embodiments, the precipitate product is transported to a location for long-term storage. Such embodiments find use where $CO_2$ sequestration is desired, since the product can be transported to a location and maintained as a storage stable above ground $CO_2$ sequestering material. For example, the carbonate precipitate may be stored at a long term storage site adjacent to the source of $CO_2$, e.g., at the power plant or at a precipitation system. In yet other embodiments, the precipitate may be transported and placed at long term storage site, e.g., above ground, below ground, etc. as desired, where the long term storage site is a distance from the source of $CO_2$ (which may be desirable in embodiments where real estate is scarce in the vicinity of the source of $CO_2$). In these embodiments, the precipitate finds use as an above-ground storage stable form, so that $CO_2$ is no longer present as, or available to be, a gas in the atmosphere. As such, sequestering of $CO_2$ according to methods of the invention results in prevention of $CO_2$ gas from entering the atmosphere and long-term storage of $CO_2$ in a manner that $CO_2$ does not become part of the atmosphere. By above-ground storage stable form is meant a form of matter that can be stored above ground under exposed conditions (i.e., open to the atmosphere) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage stable form undergoes little if any degradation while stored above ground under normal rain water pH, the amount of degradation if any as measured in terms of $CO_2$ gas release from the product will not exceed 5%/year, and in certain embodiments will not exceed 1%/year. The above-ground storage stable forms are storage stable under a variety of different environment conditions, e.g., from temperatures ranging from $-100°$ C. to $600°$ C. humidity ranging from 0 to 100% where the conditions may be calm, windy or stormy. Testing for such storage stability may be any reasonable test; in some embodiments, stability may be derived from the chemical composition of the $CO_2$ sequestering product, e.g., a product similar to a natural product such as limestone that is known to be stable under a variety of conditions for thousands or even millions of years.

In certain embodiments, the $CO_2$ sequestering product produced by the methods of the invention is employed as a building material. An additional benefit of certain embodiments is that $CO_2$ employed in the process that may be obtained from a gaseous waste stream is effectively sequestered in the built environment. By building material is meant that the carbonate mineral is employed as a construction material for some type of manmade structure, e.g., buildings (both commercial and residential), roads, bridges, levees, dams, and other manmade structures etc. The building material may be employed as a structure or nonstructural component of such structures. In such embodiments, the precipitation plant may be co-located with a building products factory.

In certain embodiments, the precipitate product is refined (i.e., processed) in some manner prior to subsequent use. Refinement may include a variety of different processes. In certain embodiments, the product is subjected to mechanical refinement, e.g., grinding, in order to obtain a product with desired physical properties, e.g., particle size, etc. In certain embodiments, the precipitate is combined with a hydraulic cement, e.g., as a supplemental cementitious material, as sand, as an aggregate, etc. In certain embodiments, one or more components may be added to the precipitate, e.g., where the precipitate is to be employed as a cement, e.g., one or more additives, sands, aggregates, supplemental cementitious materials, etc. to produce a final product, e.g., concrete or mortar.

In certain embodiments, the product is utilized to produce aggregates. Such aggregates, methods for their manufacture and use are described in co-pending U.S. Application Ser. No. 61/056,972, filed on May 29, 2008, the disclosure of which is herein incorporated by reference.

In certain embodiments, the product is employed as a component of a hydraulic cement. The term "hydraulic cement" is employed in its conventional sense to refer to a composition that sets and hardens after combining with water. Setting and hardening of the product produced by combination of the $CO_2$ sequestration product with an aqueous fluid results from the production of hydrates that are formed from the cement upon reaction with water, where the hydrates are essentially insoluble in water. Such carbonate compound component hydraulic cements, methods for their manufacture and use are described in co-pending U.S. application Ser. No. 12/126,776 filed on May 23, 2008; the disclosure of which application is herein incorporated by reference.

In some embodiments, the product is employed as a "supplementary cementitious material" (SCM). SCMs are those materials that, although they may or may not be hydraulically cementitious in and of themselves, react to a degree with a hydraulic cement composition, such as portland cement, to produce a cured material. Examples of common SCMs for use in portland cement compositions include flyash and ground granulated blast furnace slag.

Determining the $CO_2$ Sequestered in the $CO_2$ Sequestering Product

Subsequent to the production of a $CO_2$ sequestering product, e.g., as described above, the amount of $CO_2$ sequestered in the product is quantified. By "quantified" is meant determining an amount, e.g., in the form of a numeric value, of $CO_2$ that has been sequestered (i.e., fixed) in the $CO_2$ sequestering product. The determination may be an absolute quantification of the product where desired, or it may be an approximate quantification, i.e., not exact. The quantification is adequate to give a market-acceptable measure of the amount of $CO_2$ sequestered.

The amount of $CO_2$ in the $CO_2$ sequestering product may be quantified using any convenient method. In certain embodiments the quantification may be done by actual measurement of the composition. A variety of different methods may be employed in these embodiments. For example, the mass or volume of the composition is measured. In certain embodiments, such measurement can be taken while the precipitate is in the mother liquor. In these cases, additional methods such as x-ray diffraction may be used to quantify the product. In other embodiments, the measurement is taken after the precipitate has been washed and/or dried. The measurement is then used to quantify the amount of $CO_2$ sequestered in the product, for example, by mathematical calculation. For example, a Coulometer may be used to obtain a reading of the amount of carbon in the precipitated sequestration product. This Coulometer reading may be used to determine the amount of alkaline carbonate in the precipitate, which may then be converted into $CO_2$ sequestered by stoichiometry based on several factors, such as the initial alkaline metal ion content of the water, the limiting reagent of the chemical reaction, the theoretical yield of the starting materials of the reaction, etc. In some embodiments, contaminants may be present in the product, and other determinations of the purity of the product, e.g., elemental analysis, may be necessary to determine the amount of $CO_2$ sequestered.

In other embodiments, an carbon isotopic method as described in U.S. Provisional Patent Application No. 61/219,310, filed Jun. 22, 2009 and titled "Compositions and Methods Using Substances with Negative $\delta^{13}C$ Values", herein incorporated by reference in its entirety, is used to determine the amount and/or source of the $CO_2$ in the $CO_2$ sequestration product. This method is based on the knowledge that the $^{13}C/^{12}C$ ratio in fossil fuels is substantially different from the $^{13}C/^{12}C$ ratio in geologic carbon sources such as limestone. Accordingly, the $^{13}C/^{12}C$ ratio in a sample, as can be readily elucidated via mass spectrometry that quantitatively measures isotopic mass, can be used to indicate the source of the carbon. Thus, even if another source carbon, e.g., limestone is used, the utilization of mass spectrometry for isotopic analysis will allow elucidation of the amount of the carbon attributable to captured $CO_2$ from fossil fuel combustion. In this manner, the amount of carbon sequestered in the precipitate or even a downstream product that incorporates the precipitate, e.g., concrete, may be determined, particularly where the $CO_2$ gas employed to make the precipitate is obtained from combustion of fossil fuels, e.g., coal. Determining the source and/or amount of $CO_2$ sequestered based on the $^{13}C/^{12}C$ ratio in the $CO_2$ is based on the knowledge that many elements, e.g., carbon, have stable isotopes, and some of these isotopes are preferentially selected and/or concentrated in various products and/or processes, e.g., biological processes. For example, the relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard):

$$\delta^{13}C‰ = [(^{13}C/^{12}C_{sample} - ^{13}C/^{12}C_{PDB\ standard})/(^{13}C/^{12}C_{PDB\ standard})] \times 1000$$

In various processes, $^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The $CO_2$ in flue gas produced from burning fossil fuels reflects the relative carbon isotope composition values of the organic material that was fossilized. Table 1 lists relative carbon isotope composition value ranges for relevant carbon sources for comparison.

Material incorporating carbon from burning fossil fuels reflects $\delta^{13}C$ values that are more like those of plant derived material, i.e., less than that which incorporates carbon from atmospheric or non-plant marine sources. Verification that the material produced by a $CO_2$ sequestering process is composed of carbon from burning fossil fuels can include measuring the $\delta^{13}C$ value of the resultant material and confirming that it is not similar to the values for atmospheric $CO_2$ dioxide, nor marine sources of carbon.

TABLE 1

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3$) | −2 to +2 | 0 |
| Marine Bicarbonate ($HCO_3$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., Global and Planetary Change, 65 (2009) pp. 89-103.
[2]Elswick, E. R. et al., Applied Geochemistry, 22 (2007) pp. 2065-2077.

In some embodiments, the invention provides a method of characterizing a composition comprising measuring its relative carbon isotope composition ($\delta^{13}C$) value. In some embodiments the composition is a composition that contains carbonates, e.g., magnesium and/or calcium carbonates. Any suitable method that are currently available may be used for measuring the $\delta^{13}C$ value, such as mass spectrometry or off-axis integrated-cavity output spectroscopy (off-axis ICOS).

In some embodiments, the amount of $CO_2$ sequestered from a particular source of $CO_2$, e.g., a fossil fuel source is quantified. For example, coulometry may be used to determine the relative amount of carbon in a composition, and isotopic ratio values may be used to verify that the carbon is wholly or partially of fossil fuel origin. It is then a relatively simple calculation to determine the amount of $CO_2$ (or carbon) sequestered in the composition, given the relative amount of the carbon that is of fossil fuel origin and the total carbon. In some embodiments, the total $CO_2$ may be calculated without regard to origin, e.g., where a mass balance is kept between the $CO_2$ content and the volume of gas entering and exiting a $CO_2$ sequestration process, and the $CO_2$ content and volume and/or mass of the $CO_2$ sequestering product or products or the $CO_2$ sequestering process.

In other embodiments, the quantification may be done by making a theoretical determination of the amount of $CO_2$ sequestered, such as by calculating the amount of $CO_2$ sequestered. The amount of $CO_2$ sequestered may be calculated by using a known yield of the above-described method, such as where the yield is known from previous experimentation. The known yield may vary according to a number of factors, including one or more of the input of gas (e.g., $CO_2$) and water, the concentration of alkaline-earth-metal ions in the water, pH, salinity, temperature, the rate of the gaseous stream, the embodiment of the method selected, etc., as reviewed above. Standard information, e.g., a predetermined amount of $CO_2$ sequestered per amount of product produced by a given reference process, may be used to readily determine the quantity of $CO_2$ sequestered in a given process that is the same or approximately similar to the reference process, e.g., by determining the amount produced and then calculating the amount of $CO_2$ that must be sequestered therein.

In certain embodiments, the $CO_2$ sequestering product can store about 50 tons or more of $CO_2$, such as about 100 tons or more of $CO_2$, including 250 tons or more of $CO_2$, for instance about 500 tons or more of $CO_2$, such as about 750 tons or more of $CO_2$, including about 900 tons or more of $CO_2$ for every 1000 tons of concrete produced. Thus, in certain embodiments, the $CO_2$ sequestering product comprises about 5% or more of $CO_2$, such as about 10% or more of $CO_2$, including about 25% or more to of $CO_2$, for instance about 50% or more of $CO_2$, such as about 75% or more of $CO_2$, including about 90% or more of $CO_2$.

Converting the Sequestered $CO_2$ into a Tradable $CO_2$ Commodity

Embodiments of the invention include converting the quantified amount of sequestered $CO_2$ into a tradable commodity. After the amount of $CO_2$ sequestered in the $CO_2$ sequestering product has been quantified, the quantified amount is converted into a tradable commodity. By "tradable commodity" is meant a unit, e.g., a financial instrument, which may be exchanged in a market for other goods or services. Further, a traditional commodity does not vary in quality, and in certain embodiments of the invention, the commodity produced will not vary in quality. However, in certain embodiments of the invention, the commodity may be a competitor in a market with similar goods that do vary in quality from the tradable commodity of the invention, such as in the OTC offset market. In other embodiments of the invention, the tradable commodity of the invention will be completely fungible with commodities produced by other entities or methods, such as on the Chicago Climate Exchange (CCX) where fungible Carbon Financial Units (CFIs) are traded.

Because there are a number of tradable commodities into which a quantified amount of sequestered $CO_2$ may be converted, the precise method of the conversion will depend on the type of tradable commodity sought to be obtained. The following examples of tradable commodities into which the quantified amount may be converted are offered merely by way of example, and should not be construed to limit the types of commodities into which the quantified amount of sequestered $CO_2$ may be converted or the markets in which those commodities may be traded.

In certain embodiments, the tradable commodity sought is a carbon offset. As described above, an offset is an intangible good that can be purchased by an entity to "offset" its GHG emissions. This allows the entity, such as a company, a family, an individual, etc. to bear the cost of its emissions. When an offset is purchased, it means the seller has reduced the amount of atmospheric $CO_2$ in an amount corresponding to the value of the offset sold, for example, the seller has reduced the amount of atmospheric $CO_2$ by one ton of $CO_2$ per offset sold. In some of these embodiments, the quantified amount of $CO_2$ sequestered may be directly converted into tradable commodities, for example, by taking no further steps beyond quantification and routine calculation. In other embodiments where the quantified amount is to be converted into carbon offsets, the quantified amount is converted into Verified Emission Reduction (VER) units or some other carbon offset unit. A VER is an offset that has been verified by an independent auditor, i.e., an independent auditor has ensured that the company selling the offset has actually reduced the amount of atmospheric $CO_2$ by the amount the seller claims for each offset sold. The method of such conversion is discussed in greater detail below For example, verification, certification, or authentication may not be required to obtain a commodity, such as where an unverified offset is sold directly to a consumer. The quantified amount may be directly converted into an offset, such as by recording in an inventory or on a system that a certain amount of sequestered $CO_2$ is available for transfer to a customer, e.g., where one ton of sequestered $CO_2$ is converted into a one-ton $CO_2$e offset. The offset is then made available for transfer to a customer, e.g., by listing it on a website for sale.

In another embodiment, the quantified amount of sequestered $CO_2$ is converted into Verified Emission Reduction units (VERs). VERs may be sold, for example, in the OTC offset market to countries, companies, or individuals as disclosed above. VERs are emissions reductions, the quality of which has been verified by at least one independent auditor. For example, an auditor may be selected from the list provided by the Carbonfund.org Foundation at, for example, the Internet site: http://www.carbonfund.org/site/pages/our_projects/category/Verification/. The auditor may then be given information about the method of sequestration, and may visit one or more locations at which sequestration occurs according to the above-described method. The auditor may further investigate business practices employed by the possessor of the invention, including the method of calculating the quantified amount, the procedure by which offsets are recorded in an inventory or by a system, etc. The auditor may then upon approval of the invention list the method of the invention in a registry of verified emissions reductions, and issue or authorize the use of certain documents or images, such as labels, logos, stamps, etc. that are symbols indicative of a verified emission reduction. The method of embodiments of the invention may then use such documents or images as a certificate of verification when marketing and transferring the offsets to a customer.

In yet other embodiments, the tradable commodity sought is a carbon allowance or other related financial instrument. The method of converting the quantified amount into an allowance or other related financial instrument will vary based on the type of allowance or instrument sought. For example, in certain embodiments, the quantified amount of $CO_2$ sequestered is converted into, for example, a Carbon Financial Instrument (CFI), a Certified Emission Reduction (CER), an Emission Reduction Unit (ERU), a European Union Allowance (EUA), a Voluntary Carbon Unit (VCU), or any of a number of other carbon financial instruments. The method of such conversion is discussed in greater detail below.

In certain embodiments of the invention, the quantified amount of sequestered $CO_2$ is converted into Carbon Financial Instruments (CFIs). CFIs may be traded, for example, on the CCX. To convert a quantified amount of sequestered $CO_2$ into CFIs, CCX is contacted and a procedure specified by CCX is followed. Such a procedure might include, for example, the steps of: 1) submitting a project proposal and/or questionnaire to CCX; 2) obtaining project approval from the Committee on Offsets; 3) obtaining independent project verification from a CCX-approved verifier; 4) registering as a CCX Offset Provider and/or Offset Aggregator; and 5) receiving CFI contracts for project offsets.

In other embodiments of the invention, the quantified amount of sequestered $CO_2$ is converted into Certified Emission Reduction units (CERs). CERs may be purchased, for example, in the OTC market from providers or aggregators, or may be converted into European Union Allowances (EUAs) or other financial instruments to be utilized or traded on an exchange. CERs are issued under the Clean Development Mechanism (CDM) of the Kyoto Protocol, which is administered by the United Nations Framework Convention on Climate Change (UNFCCC) (see, e.g., the Internet site: http://unfccc.int/2860.php/ for more information about the UNFCCC). Information about the CDM, including information about CERs such as about the verification, use, and transfer of CERs, may be found at http://cdm.unfccc.int/index.html, which website is herein incorporated by reference.

The CDM is a project-based mechanism for countries, and in turn entities within countries, to meet their Kyoto obligations. To convert a quantified amount of sequestered $CO_2$ into CERs, a project first, for example, is typically qualified through a registration and issuance process overseen by the CDM Executive Board, after obtaining approval from the Designated National Authorities (DNA).

In yet other embodiments of the invention, the quantified amount of sequestered $CO_2$ is converted into Emission Reduction Units (ERUs). ERUs may be purchased, for example, in the OTC market from providers or aggregators, or may be converted into European Union Allowances (EUAs) or other financial instruments to be utilized or traded on an exchange. ERUs are issued under the Joint Implementation plan (JI) of the Kyoto Protocol, which is administered by the United Nations Framework Convention on Climate Change (UNFCCC). Information about the JI, including information about ERUs, such as about the verification, use, and transfer of ERUs, may be found at, e.g., the Internet site: http://ji.unfccc.int/index.html, the contents of which website is herein incorporated by reference. The JI is a project-based mechanism for countries to meet their Kyoto obligations. To convert a quantified amount of sequestered $CO_2$ into ERUs, a project is first, for example, typically qualified by an Accredited Independent Entity (AIE) as approved by the Joint Implementation Supervisory Committee (JISC).

JI and CDM projects differ according to the type of country in which they are carried out. Generally, CDM projects allow developed countries with Kyoto commitments to reduce emissions in developing countries (that are likely not bound by Kyoto) in order to meet the developed countries' Kyoto commitments, a mechanism that is typically less expensive than reducing emissions in a developed country. JI projects, by contrast, involve reducing emissions in developed countries to meet Kyoto obligations.

The conversion of the quantified amount into CERs or ERUs may be facilitated by utilizing independent auditors approved by the UNFCCC and its subsidiary bodies. In certain embodiments, these auditors may be the same as those listed by the Carbonfund.org Foundation at the website listed above. For example, The Gold Standard® (see, e.g., Internet site: http://www.cdmgoldstandard.org) may be used to obtain VERs, CERs, and ERUs. These commodities may be obtained according to the method set forth in the document entitled, "The Gold Standard® Premium quality carbon credits: Requirements," available at, e.g., the Internet site: http://www.ecofys.com/com/publications/documents/GSV2_Requirements_20080731_2.0.pdf, which document is herein incorporated by reference.

In other embodiments of the invention, the quantified amount of sequestered $CO_2$ is converted into European Union Allowances (EUAs). EUAs may be traded, for example, on the ECX or in the OTC market, and are the standard unit of the European Union Emissions Trading Scheme (EU ETS), the world's largest cap and trade system. To convert a quantified amount of sequestered $CO_2$ into EUAs, the quantified amount may, for example, be first converted into an intermediary unit that may then be converted into EUAs. For example, the quantified amount may first be converted into CERs or ERUs as described above. As carbon markets mature, however, other units may become fungible with EUAs or it may be possible to directly convert projects into EUAs, methods that are embodiments of the invention.

Transferring the $CO_2$ Commodity to a Customer

Embodiments of the invention further include the transfer of the tradable commodity to a customer. By "transfer" is meant the commodity is given to a customer, sold to a customer for a price, or placed on an exchange for a price where a customer may then purchase the commodity. By "customer" is meant the receiver of the tradable commodity. The customer, as described below, may be the generator of $CO_2$, or may be some third-party that is different from the generator of $CO_2$.

Transferring the commodity may occur through any convenient procedure. For example, the transfer may occur electronically or may include the physical transfer, e.g., by mailing an item (e.g., a document), or both. The transfer may involve the receipt of payment such as where payment is made either before or after the commodity is transferred. In certain embodiments, the transaction may involve one or more intermediate parties, such as a commodity aggregator, broker, or exchange. In other embodiments, the tradable commodity is transferred directly to the customer.

Upon transfer of the commodity, the transaction may be recorded, such as, for example, in a log, inventory, database, server, document, machine, etc. Such recordation may be either manual, such as by a user, or automatic, such as by a machine. In some embodiments, the user may record transfers in a document or on a computer, such as by writing down the transfer in a log or by typing it into a word processing document or database that is then saved. In other embodiments, a machine such as a computer may automatically record the transfer. In some of these embodiments, the recordation may further include calculating the number of tradable commodities available to be transferred as a result of the sale. The calculating may be done, for example, by debiting the number of commodities transferred against the total number of commodities available.

Where desired, a commodity may be transferred on the Chicago Climate Exchange (CCX) (see, e.g., the Internet site: http://www.chicagoclimatex.com/). After converting the quantified amount into CFIs tradable on the CCX as described above, a user or a machine may log onto the exchange through the CCX website listed above. After logging onto the exchange, the user or machine may list commodities available for sale on the exchange and set the prices at which those commodities may be sold, i.e., transferred, to a customer acting as a buyer on the exchange.

In other embodiments, a commodity may be transferred to an entity within a country bound by Kyoto Protocol commitments or an equivalent e.g. a protocol based on a future international agreement, e.g., the Copenhagen meeting of December 2009. Such an entity may be, for example, a government, such as a national, regional, or local government. In other embodiments, the entity may be part of a private sector, such as a corporation, company, organization, individual, or group of individuals. For example, such an entity may have particular interest in CERs or ERUs generated by the invention, since these commodities may allow them to meet their Kyoto commitments. In these embodiments, after converting the quantified amount into CERs or ERUs as described above, the possessor of the commodity may communicate with such a government or entity, such as by postal mail, electronic mail, telephone, advertising, or any other convenient means. Alternatively, the entity may contact the possessor directly. Such communication may be facilitated by the listing of the possessor's contact information and information about the commodity on a commodity registry maintained by an auditor, as described above. A price for a number of CERs or ERUs may be negotiated, e.g., the commodities may be bargained for. After the possessor and the entity have agreed on a price, they may arrange for transfer of the commodity according to any convenient means, such as electronically, physically (e.g., by postal service), etc.

The $CO_2$ Generator and $CO_2$ Sequesterer

Embodiments of the invention include systems and methods of acquiring the $CO_2$ such as, for example, from a manufacturing or other process of which $CO_2$ may be a product or byproduct. In certain embodiments, $CO_2$ is generated and then sequestered according to the method described above. In other embodiments, the generated $CO_2$ is forwarded to a $CO_2$ sequesterer where it is sequestered in accordance with to the methods described above.

Where desired, the $CO_2$ generator may provide consideration (e.g., valuable consideration, such as currency) to the sequesterer in exchange for the sequesterer's receipt of the forwarded $CO_2$. In other embodiments, the $CO_2$ generator may not provide consideration in exchange for the sequesterer receiving the $CO_2$. In some embodiments, the tradable commodity produced from the method is then transferred to the generator of $CO_2$. By contrast, in other embodiments, the sequesterer retains the tradable commodity. In still other embodiments, the tradable commodity may be transferred to a third party that is neither the generator nor the sequesterer of $CO_2$. While in many embodiments the third party will provide consideration in exchange for the tradable commodity, in some embodiments the third party may not provide consideration.

Consideration, also commonly referred to as "tipping fees", may also be granted by the $CO_2$ generator for the sequestering of other pollutants of interest, sometime referred to as "criteria pollutants". In the power generation and industrial smelting and cement industries, these pollutants often include hazardous products and gas "pollutants" such as sulfur oxides, nitrogen oxides, particulates, as well as other regulated pollutants such as mercury and other heavy metals, radioactive substances, and the like. The carbonate precipitation process may sequester some or all of these pollutants, and in doing so provide a service of considerable value to the $CO_2$ generator, resulting in the payment of tipping fees by the generator. In some markets, these pollutant emissions allowances e.g., criteria pollutants emission allowances are granted to industries that burn fossil fuels, and are traded much like carbon credits and allowances as previously described.

The possessor of the tradable commodity (whether the possessor is the sequesterer or the generator or some third party) may then transfer the commodity. The commodity may be transferred, for example, by trading the commodity on an exchange. For example, the possessor may trade the commodity on the Chicago Climate Exchange (CCX), the European Climate Exchange (ECX), or on some other exchange where carbon sequestration tradable commodities may be transferred. Alternatively, the possessor may choose to sell the commodity to a customer, such as in the OTC market.

In certain embodiments of the system and method, e.g., valuable consideration, such as currency, is involved in the transaction where the tradable commodity is transferred. Such consideration may be involved whether the transaction occurs on an exchange or directly with a customer. For example, the customer may be the generator of $CO_2$, and may provide some consideration for the sequestration of the $CO_2$, regardless of whether the generator, the sequesterer, or some third party retains the tradable commodity once the commodity is produced. Alternatively, the sequesterer may give consideration to the $CO_2$ generator or producer in exchange for the $CO_2$. In some embodiments of the invention, the amount of consideration provided (as well as who is responsible for providing as well as who receives consideration) may be linked to the terms of the subsequent distribution of tradable commodities, i.e., the agreement between the possessor of the invention and the customer may correlate consideration with the distribution and number of commodities generated. For example, the generator may give the sequesterer more consideration if the generator is to retain rights to the tradable commodities produced.

In still other embodiments the customer of the $CO_2$ sequesterer may be some third party not involved in generation of $CO_2$. In these embodiments, the customer may provide consideration to the sequesterer in exchange for some tradable commodities. The invention further encompasses all other permutations of arrangements between the sequesterer, generator, and third parties where consideration is provided in exchange for the transfer of one or more of $CO_2$, tradable commodities, or some intermediate product of the above-described method.

Systems and Methods of Transferring the $CO_2$ Commodity

As indicated above, embodiments of the invention provides for systems and methods of facilitating an electronic transfer of tradable commodities. Such systems may include a computer, e.g., a computer connected to the Internet and having software configured to communicate with a customer or an exchange. The system in various embodiments embodiment can be configured to transfer tradable commodities obtained from the method described above to a customer or on an exchange. In an exemplary embodiment, the number of commodities available for transfer onto the system is uploaded to the system. This may be done, for example, by a user, or by a machine, e.g., by a mechanical or electronic process. The number of commodities available may be quantified based on the actual amount of $CO_2$ sequestered. In other embodiments, the number of commodities available may be approximated, such as by calculating based on a known (approximate or exact) rate of sequestration of $CO_2$ input into the system. Such calculation may estimate with reasonable certainty the number of commodities available in real time, or may project the number of commodities that will be available at some future time.

In some embodiments, the system can be configured to send to an exchange the number of commodities available for trade on that exchange, i.e., the system is capable of placing commodities on an exchange. For example, the number of commodities available may be sent to the exchange by uploading that number to a server, e.g., via the Internet. The price at which each commodity is sold may be sent, e.g., uploaded, to an exchange. In certain embodiments, the prices of each of these commodities on an exchange may be the same. In other embodiments, the prices of some commodities offered on an exchange may be higher or lower than other commodities, even in cases where the commodities are entirely fungible, i.e., the same.

In some embodiments, the system can be configured to communicate with a number of different exchanges, such as the Chicago Climate Exchange, European Climate Exchange, Montreal Climate Exchange, or any other exchange on which a carbon sequestration tradable commodity obtained by $CO_2$ sequestration may be traded. In certain embodiments, the system can be configured to configured to buy as well as sell tradable commodities on any of these exchanges. When a commodity is sold on an exchange, the system receives and registers the receipt of payment, and further registers the sale or transfer of the commodity. When a commodity is purchased on an exchange, the system authorizes payment and registers the debit, and further registers the additional commodity obtained. Moreover, the system may update the inventory of commodities available to customers directly or on each exchange with which it is connected based on transactions that have occurred with other customers or on other exchanges.

As described above, in certain embodiments, the invention pertains to methods of trading or selling a tradable commodity directly to a customer (rather than through a commodity exchange), e.g., on the OTC offset market. In these embodiments, the system may be configured to recruit customers, e.g., by advertising. The system may communicate to the customer, via the Internet or other means, information about the offsets available for sale. In particular, the system may communicate information about the quality of the offset, such as about the means of its production. The system may further provide opportunities for the customer to estimate or calculate its "emissions footprint", e.g., its "carbon footprint" in $CO_2$. Such estimation may aid the customer in determining the number of commodities it may desire to purchase to meet its needs.

In some embodiments, when a customer chooses to purchase offsets, the system can be configured to execute the transaction. This can be accomplished, for example, by configuring the system to receive payment, issue a receipt of purchase to the customer for verification, debit the inventory of offsets available by the number of offsets purchased, and the like.

In some embodiments, when commodities are sold or traded to a customer or on an exchange, the system can be configured to account for the number of commodities sold, transferred, or acquired. The system also can be configured to determine the number of commodities still available, and to update according to the method described above the exchanges and customers with which it is in communication at certain intervals, such as more frequently than about once per month, more frequently than about once per week, more frequently than about once per day, more frequently than about once per hour, in real-time, or in any other convenient interval.

In some embodiments, the system can be configured to provide and receive consideration associated with the transfer of one or more of $CO_2$, tradable commodities, or some intermediate of the above-described methods. For example, such consideration may be valuable consideration, e.g. currency.

An embodiment of the system 100 is illustrated schematically in FIG. 1. With reference to in FIG. 1, a carbonate-containing $CO_2$ sequestering product 110, e.g., produced from the above-described methods, is quantified. Such quantification, as disclosed above, may be done by any conventional means, for example, by measuring the amount of carbonate in the $CO_2$ sequestering product and correlating this measurement to an amount of sequestered carbon dioxide. Such measuring may be done in certain embodiments by measuring the mass or volume of the $CO_2$ sequestering product. That measurement may then be converted to tradable commodity 120. Such conversion may be done by any conventional means, for example, by a routine mathematical/chemical calculation. In certain embodiments, it may be desirable to obtain verification or authentication of the sequestration process before the conversion into the tradable commodity 120 is complete. The dashed arrows as illustrated in FIG. 1 indicate that the step represented by those arrows may only be present in certain embodiments of the invention.

Tradable commodity 120 is then input into system 130. This may be done manually, for example, by user 170. Alternatively, the tradable commodity may be input, e.g., registered or uploaded, into system 130 automatically, e.g., mechanically or electronically. The system is in communication with a customer 160 and/or an exchange 150 via a computer network such as the Internet 140. For example, the system may operate on Internet 140 using a website, or may send communications via Internet 140 to customer 160 and exchange 150. Such communications may include information about the quantities of tradable commodities available and the prices at which each of those tradable commodities are available. In addition, system 130 may be configured to receive communications from customer 160 and exchange 150. Customer 160 may send information via Internet 140 to system 130 indicating the quantity of tradable commodities sold by the invention (those purchased by the customer) in some transaction. Exchange 150 may send information to system 130 via Internet 140 regarding quantities of tradable commodities transferred on the exchange, and the prices at which those quantities were transferred. After system 130 has registered these transactions, it may update exchange 150 and customer 160 with the new quantities and prices of tradable commodities available, e.g., the system will repeatedly update the customers and exchanges with which it is in communication after each transaction, such as in regular intervals. In addition, system 130 may communicate this information to user 170. User 170 may input information into system 130, such as information about the price and quantity of tradable commodities available. User 170 may also input information about the quality of tradable commodity 120 or communicate other information to customer 160 and exchange 150 via system 130 and Internet 140.

In some embodiments, a salable product, e.g., a cement product, is produced by sequestering carbon dioxide in the $CO_2$ sequestering product. Consequently, in these embodiments, an additional tradable commodity (with respect to the initial commodity generated by the sequestration step) may be generated by selling this salable product to a user, e.g., company, individual, or other entity, that would have purchased a different cement product had the $CO_2$ sequestering salable product not been available, and wherein the manufacture of that different alternative product would have emitted a substantially greater amount of $CO_2$ than that emitted by producing the present $CO_2$ sequestering product. Thus, in certain embodiments, the present system may be configured to account for commodities produced at each and every of these stages of a salable product production, and to transfer carbon sequestration tradable commodities to a customer or on an exchange based on that accounting. In various embodiments, the present system encompasses all possible permutations of transfer of commodities based on the above disclosed methods, for example, where the sequesterer and/or manufacturer retains some or all of the above described commodities, and where the sequesterer and/or manufacturer transfers some or all of the above described commodities to a customer, to a producer of $CO_2$, to some third party or parties, or on an exchange.

The present system further encompasses all embodiments where consideration is exchanged between one or more of the sequesterer, manufacturer, customer, producer of $CO_2$, and third party. This consideration may be exchanged in association with the exchange of some other commodity, such as $CO_2$, the $CO_2$ sequestering product, e.g., a cement, an aggregate or the like. In other embodiments, consideration may not be tied to an exchange of the commodity.

Figure 2:
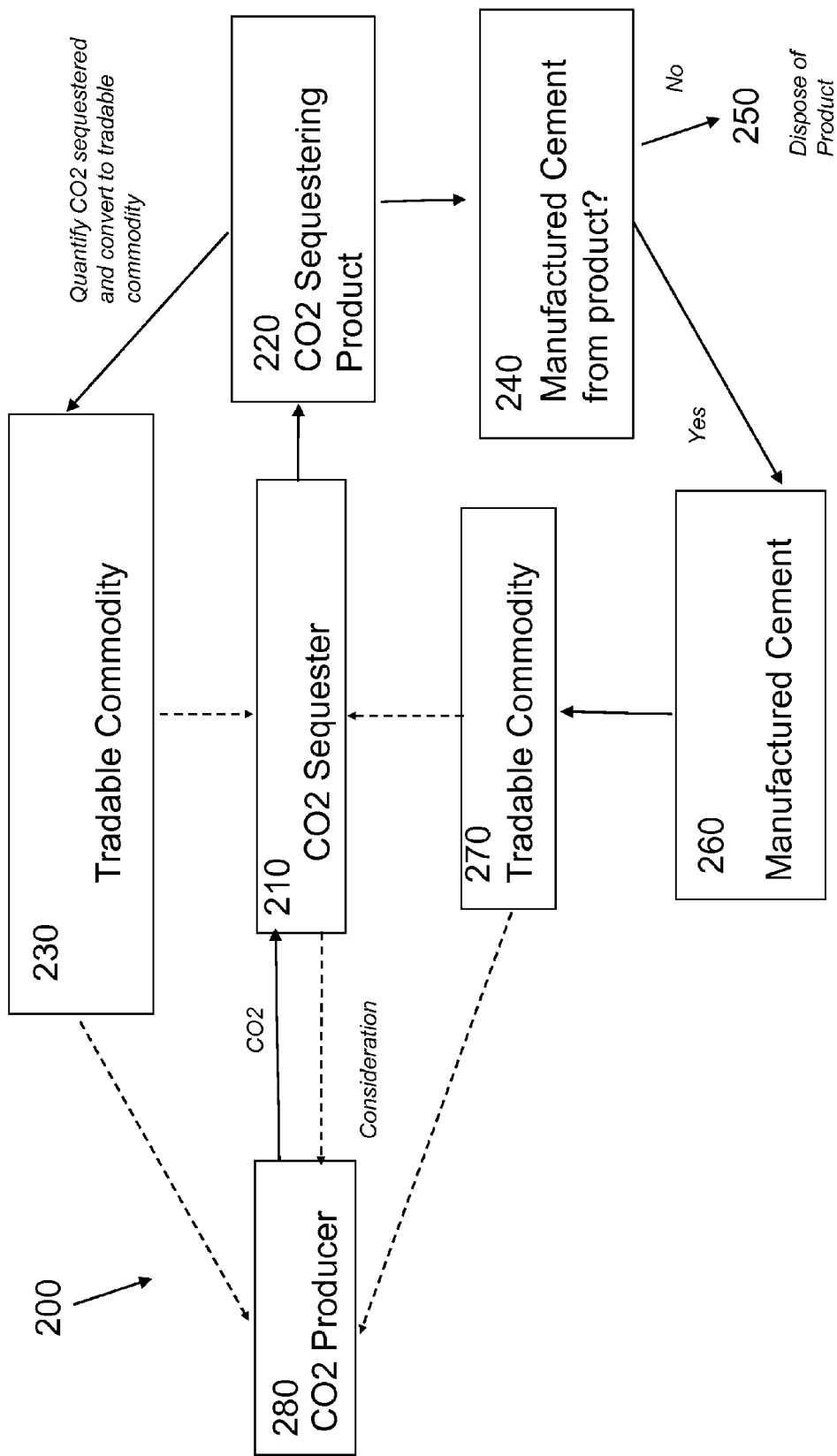
FIG. 2 is an illustration of an embodiment of a method for generating the tradable commodities.

FIG. 2 illustrates an example of the system 200 wherein a tradable commodity is generated based on producing a salable product, e.g., a cement, from the $CO_2$ sequestering product as described above. In FIG. 2, a $CO_2$ producer 280 generates $CO_2$ and forwards it to $CO_2$ sequesterer 210. The $CO_2$ sequesterer 210 may provide consideration to the $CO_2$ producer 280, or the $CO_2$ producer 280 may provide consideration to the $CO_2$ sequesterer 210 as is illustrated by the dashed lines. The $CO_2$ sequesterer 210 then produces a carbonate-containing $CO_2$ sequestering product 220, such as by the methods described above. The $CO_2$ sequestering product 220 is quantified and converted into tradable commodity 220 and may then be returned to the $CO_2$ producer 280, the $CO_2$ sequesterer 210, or divided (either proportionally or disproportionally) between them. Other transactions between the CO2 producer 280, the CO2 sequester regarding the tradable commodity 230, 270 are indicated by the dashed lines in FIG. 2.

In some embodiments, and with reference to FIG. 2, a determination is made at step 240 regarding whether a salable product, e.g., cement, will be manufactured from $CO_2$ sequestering product 220. If a cement will not be manufactured, $CO_2$ sequestering product 220 is disposed at step 250. Alternatively, manufactured cement 260 is produced, such as by using an intermediate aggregation step as described above. The reduction of atmospheric $CO_2$ resulting from the sale of manufactured cement 260—the manufacture of which requires the release of less $CO_2$ than does the manufacture of other building and construction cements—as opposed to such other building and construction cements generates tradable commodity 270. Tradable commodity 270 may then be transferred to $CO_2$ producer 280, $CO_2$ sequesterer 210, or divided (either proportionally or disproportionally) between them. The manufactured product may be a cement as in this example, or, e.g., some other product useful in the built environment such as an aggregate or a supplementary cementitious material or combinations thereof.

Figure 3:
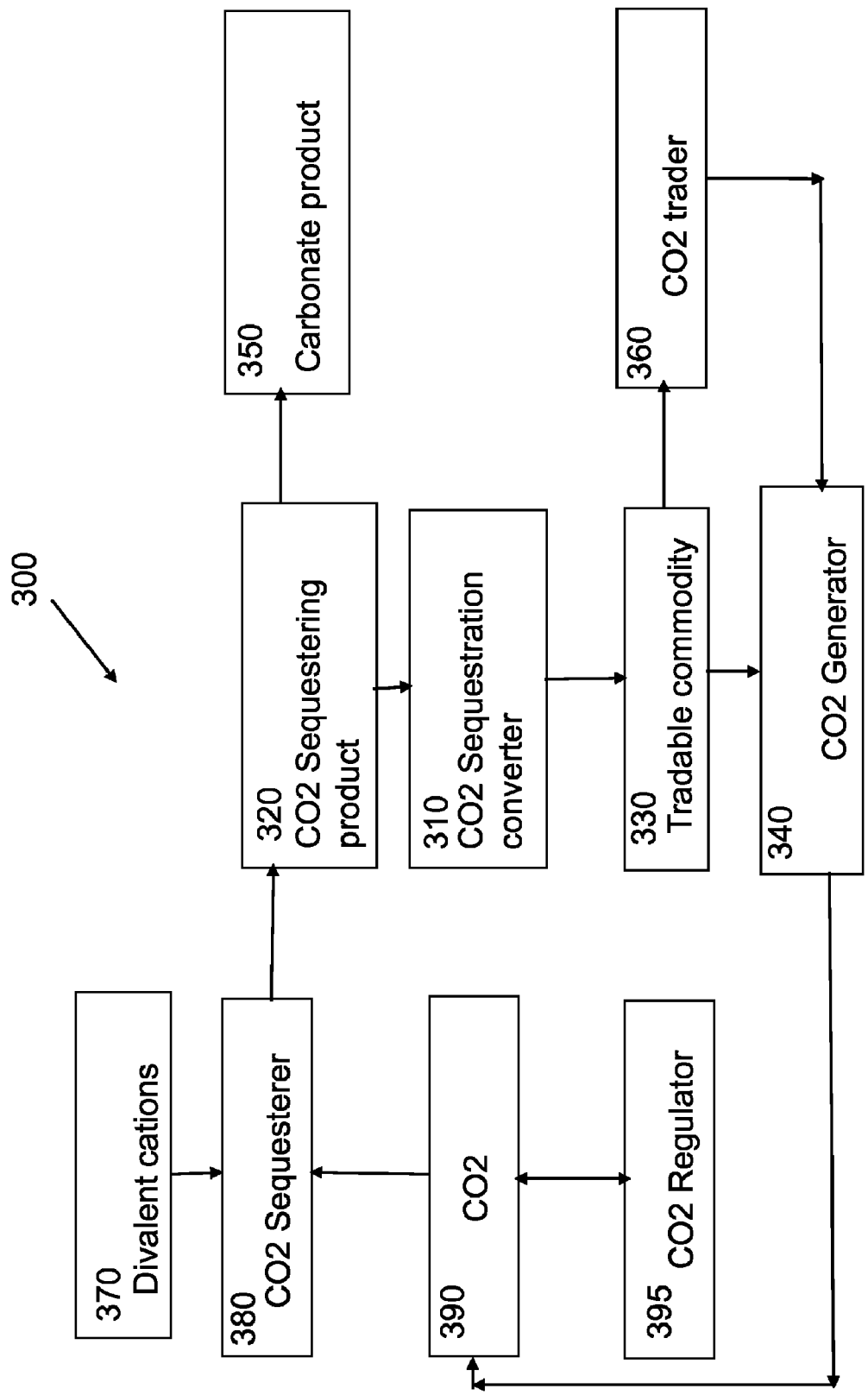
FIG. 3 is an illustration of an embodiment of a computer-implemented system of trading the commodities.

FIG. 3 is an illustration of an embodiment of a computer-implemented system 300 of trading the tradable commodity 330. In one implementation, the system 300 comprises, a $CO_2$ sequestration converter 310 programmed to convert a quantified amount of $CO_2$ sequestered in a $CO_2$ sequestering product 320 into a tradable commodity 330. In some embodiments, the $CO_2$ sequestering product comprises a carbonate and/or bicarbonate, such as calcium or magnesium carbonate and/or bicarbonate, produced as described above. In various embodiments, the tradable commodity 330 comprises a tradable instrument that may include a $CO_2$ emission certificate, a $CO_2$ emission permit, a $CO_2$ emission credit, a carbon offset, carbon allowance, or a criteria pollutant allowance. In other embodiments the tradable instrument include a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

In various embodiments of a computer-implemented system, the system 300 includes a $CO_2$ sequesterer 380 module or a $CO_2$ regulator 395 module that is programmed to issue the tradable commodity. In a manual system, the sequester may comprise a facility for sequestering carbon dioxide as describe above; similarly, in a manual system, the regulator may be a government regulator. In various embodiments, the $CO_2$ sequesterer 380 issues the tradable commodity based on the amount of $CO_2$ quantified in the $CO_2$ sequestering product 320; in other embodiments, the $CO_2$ regulator may issue the tradable commodity based on the amount of $CO_2$ in the environment.

In some embodiments, system 300 includes a $CO_2$ generator 340, a $CO_2$ trader 360, or the $CO_2$ sequesterer 380 that is programmed to acquire the tradable commodity. In a computer implementation of the system, the a $CO_2$ generator 340, a $CO_2$ trader 360 or the $CO_2$ sequesterer 380 may comprise a program module, whereas in a manual system, the a $CO_2$ generator 340 may comprise a facility that generates and emits carbon dioxide, e.g., a power generating plant, a cement plant, an ore processing facility, and the like; and the $CO_2$ trader and/or the $CO_2$ sequesterer 380 may be individuals or corporate entities. In various embodiments, the tradable commodity is acquired by a transfer of consideration, e.g., money, among the $CO_2$ generator, the $CO_2$ sequesterer and the $CO_2$ trader. In various embodiments, the $CO_2$ generator, the $CO_2$ sequesterer and the $CO_2$ trader comprise a single entity.

In various embodiments, the tradable commodity 330 is valid for a permitted amount of $CO_2$ emissions; in other embodiments, the tradable commodity is valid for a limited time. In some embodiments, the tradable commodity is priced based on the supply and demand for the tradable commodity in a commodity market such as the CCX. In other embodiments, the tradable commodity is priced based on the amount of $CO_2$ in the environment, e.g., the pricing is based on the carbon dioxide concentration in the atmosphere at one time relative to the carbon dioxide concentration at a baseline year. In some embodiments, the $CO_2$ sequesterer or the $CO_2$ generator may transfer the tradable commodity to a third party, or the $CO_2$ sequesterer or the $CO_2$ generator may to retire the tradable commodity after its has been acquired or after it has expired.

In various embodiments, the amount and/or source of the $CO_2$ is determined by measuring the $^{13}C$ isotope in the $CO_2$ sequestration product as described herein; in other embodiments, the amount of $CO_2$ is determined by a conventional chemical procedures that determine the composition of a material. In various embodiments, the $CO_2$ generator may issue instructions for paying a tipping fee to the $CO_2$ sequesterer as described herein. Thus, in various embodiments, the $CO_2$ sequestration converter can estimate the carbon emission footprint by the $CO_2$ generator. In various embodiments, the system is configured to perform several management functions including: receiving payments for the tradable commodity; issuing a receipt for purchase of the tradable commodity; and/or managing the inventory of tradable commodity. In various embodiments, the system may comprise a computer network or can be operated without a computer network.

In another embodiment (not illustrated), the system comprises a $CO_2$ commodity trading system, comprising: a $CO_2$ sequesterer configured to sequester $CO_2$ into a $CO_2$ sequestering product; and a $CO_2$ sequestration converter configured to quantify the sequestered $CO_2$ into a tradable commodity. As with the system of FIG. 1, the $CO_2$ sequesterer is a system configured to contact $CO_2$ with a divalent cation solution to produce the $CO_2$ sequestering product comprising a carbonate and/or bicarbonate, e.g., calcium and/or magnesium carbonate and/or bicarbonate. In various embodiments, the $CO_2$ sequestration converter comprises a system configured to: determine the amount of $CO_2$ sequestered in the $CO_2$ sequestering product; and produce the tradable commodity. As with the system of FIG. 1, the tradable commodity comprises a tradable instrument comprising: a $CO_2$ emission certificate, a $CO_2$ emission permit, a $CO_2$ emission credit, a carbon offset, carbon allowance, or a criteria pollutant allowance. In various embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

As with system 100 of FIG. 1, in this system, the $CO_2$ sequesterer can issue the tradable commodity based on the amount of $CO_2$ sequestered in the $CO_2$ sequestration product. In various embodiments, a $CO_2$ generator or the $CO_2$ sequesterer may acquire the tradable commodity. Since the tradable commodity is valid for a permitted amount of $CO_2$ emissions, in one embodiment, by acquiring the tradable commodity the $CO_2$ generator may rely on the acquisition to emit the permitted amount of $CO_2$ beyond a regulated amount. In another embodiment, the $CO_2$ sequesterer can use the acquisition to trade with other $CO_2$ generators in the tradable commodity. Thus, in various embodiments, the tradable commodity is priced based on the supply and demand for the tradable commodity as in a commodity market as, e.g., the CCX. Factors that can influence the price of the commodity include the amount of $CO_2$ in the environment, and the regulated amount of $CO_2$ that can be emitted in a specified time frame. In some embodiments, the $CO_2$ generator is a $CO_2$ emitting facility, e.g., a fossil fuelled electrical power generating plant, a cement producing plant or an ore processing plant; in other embodiments, the $CO_2$ generator, the $CO_2$ sequesterer and the $CO_2$ trader comprise a single entity.

Also as with the system of FIG. 1, in this system, the $CO_2$ sequesterer or the $CO_2$ generator may retire the tradable commodity, depending on how much $CO_2$ they have emitted. In various embodiments, the amount and/or source of the $CO_2$ can be determined by measuring the $^{13}C$ isotope in the $CO_2$ sequestration product as disclosed above. Thus, in various embodiments, the $CO_2$ sequestration converter can estimate the carbon emission footprint of a $CO_2$ emitter. In some embodiments, the $CO_2$ generator may pay a tipping fee to the $CO_2$ sequesterer, also as discussed above. In various embodiments, the system can be configured to performs and does perform several management functions including receiving payment for the tradable commodity; issuing a receipt for purchase of the tradable commodity; and managing the inventory of tradable commodity. In various embodiments, the system I implemented on a computer network or a manual system.

In another embodiment, the invention comprises an installable computer program product comprising program modules that can be executed to convert a quantified amount of $CO_2$ sequestered in a $CO_2$ sequestering product into a tradable commodity. Another module in the program product includes a $CO_2$ sequestration converter module for receiving sequestered $CO_2$ data; calculating a quantity of tradable commodity based on the sequestered $CO_2$ data; and issuing instructions to produce the tradable commodity. As with the systems of FIGS. 1 and 2, the $CO_2$ sequestering product comprises a divalent cation carbonate or bicarbonate comprising magnesium or calcium.

In various embodiments, the modules of the program product can be executed in the computer to produce the tradable commodity, e.g., a tradable instrument comprising, e.g., a $CO_2$ emission certificate, a $CO_2$ emission permit, a $CO_2$ emission credit, a carbon offset, carbon allowance, or a criteria pollutant allowance. In various embodiments, the tradable instrument may include a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee. In some embodiments, the program product modules may be programmed to issue the tradable commodity, e.g., based on the amount of $CO_2$ quantified in the $CO_2$ sequestration product, or based on the amount of $CO_2$ in the environment in compliance with, e.g., a governmental $CO_2$ regulation. In other embodiments, a $CO_2$ generator module or a $CO_2$ trader module is programmed to acquire the tradable commodity.

In various embodiments, the program product is programmed to issue a tradable commodity that is valid for a permitted amount of $CO_2$ emissions, and/or is valid for a limited time. In some embodiments, the tradable commodity is priced based on the supply and demand for the tradable commodity; in other embodiments, the tradable commodity is priced based on the amount of $CO_2$ in the environment. In various embodiments, the $CO_2$ generator module is correlated to a $CO_2$ emitting facility such as an electrical power generating plant, a cement producing plant or an ore processing plant. In some embodiments, the $CO_2$ generator, the $CO_2$ sequesterer and the $CO_2$ trader of as represented in the program product comprise a single entity.

In various embodiments, the $CO_2$ sequesterer module or the $CO_2$ generator module of the program product is programmed to transfer the tradable commodity to a third party; in other embodiments, the $CO_2$ sequesterer module or the $CO_2$ generator module is programmed to retire the tradable commodity. In another embodiment, the program product is programmed to determine the amount and/or source of the $O_2$ by measuring the $^{13}C$ isotope in the $CO_2$ sequestration product. In some embodiments, the $CO_2$ generator is programmed to issue instructions for paying a tipping fee to the $CO_2$ sequesterer; in other embodiments, the $CO_2$ sequestration converter module is programmed to estimate a carbon emission footprint. In some embodiments, the system is configured to execute several management functions including issuing a receipt for purchase of the tradable commodity; or manage the inventory of tradable commodity. In various embodiments, the product is installed and executable in a computer network.

In another embodiment, the invention pertains to a tradable commodity that is correlated to $CO_2$ sequestered in a $CO_2$ sequestering product. As disclosed above, in various embodiments the $CO_2$ is sequestered as a carbonate and/or bicarbonate, comprising calcium and/or magnesium; and the tradable commodity comprises a tradable instrument comprising a $CO_2$ emission certificate, a $CO_2$ emission permit, a $CO_2$ emission credit, a carbon offset, a carbon allowance, or a criteria pollutant allowance, wherein the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee. As with the other embodiments described herein, the tradable commodity in various embodiments may authorize a permitted amount of $CO_2$ emissions; or may authorize $CO_2$ emissions for a limited time. In various embodiments, the tradable commodity is priced based on the amount of $CO_2$ in the environment, or the amount of $CO_2$ emissions from a $CO_2$ emitting facility, or a tipping fee paid by the $CO_2$ emitting facility to the $CO_2$ sequesterer. In various embodiments, the $CO_2$ emitting facility is an electrical power generating plant, a cement producing plant or an ore processing plant.

Figure 4:
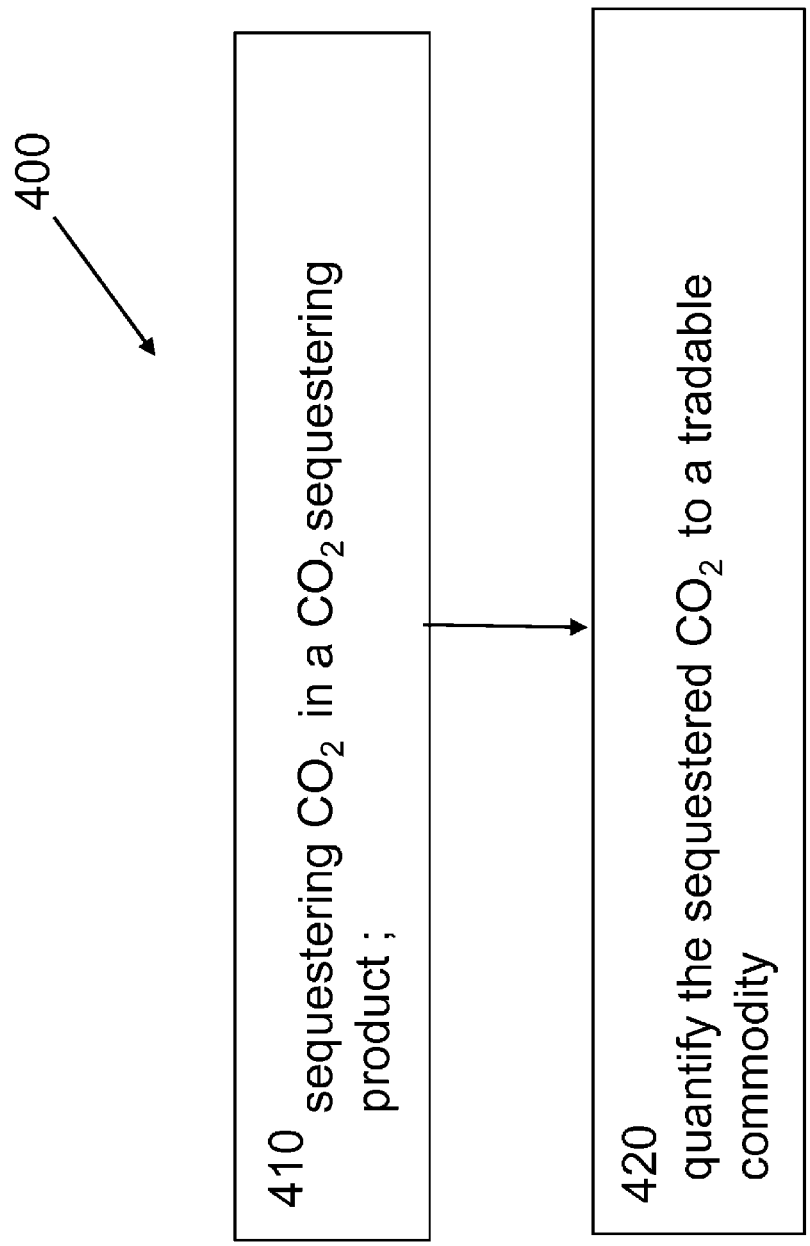
FIG. 4 is an illustration of an embodiment of a method for obtaining the tradable commodities.

FIG. 4 is an illustration of an embodiment of a method 400 for obtaining the tradable commodities. In one embodiment, the method comprises sequestering $CO_2$ in a $CO_2$ sequestering product; and quantifying the sequestered $CO_2$ to a tradable commodity. As with the other embodiments, the $CO_2$ sequestering product comprises a carbonate and/or bicarbonate comprising, e.g., calcium and/or magnesium. In various embodiments, the tradable commodity comprises a tradable instrument such as a $CO_2$ emission certificate, a $CO_2$ emission permit, a $CO_2$ emission credit, a carbon offset, carbon allowance, or a criteria pollutant allowance. In some embodiments, tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee. In some embodiments, the tradable commodity is issued by the $CO_2$ sequesterer the $CO_2$ regulator based on the amount of $CO_2$ quantified in the $CO_2$ sequestration product, or based on the amount of $CO_2$ in the environment. Once issued, the tradable commodity can be acquired by the $CO_2$ generator or the $CO_2$ trader. In various embodiments, the tradable commodity is valid for a permitted amount of $CO_2$ emissions and/or for a limited time. In some embodiments, the price of the tradable commodity is based on the supply and demand for the tradable commodity in a commodity market, or is based on the amount of $CO_2$ in the environment. In some embodiments, the $CO_2$ generator pays a tipping fee to the $CO_2$ sequesterer. In some embodiments, the tradable commodity is correlated to a $CO_2$ emissions by a $CO_2$ emitting facility such as an electrical power generating plant, a cement producing plant or an ore processing plant. In some embodiments, the $CO_2$ sequesterer or the $CO_2$ generator can retire the tradable commodity. In various embodiments, the amount and/or source of the $CO_2$ is determined by measuring the $^{13}C$ isotope in the $CO_2$ sequestration product. In some embodiments, the method comprises receiving payment for the tradable commodity; issuing a receipt for purchase of the tradable commodity; or managing the inventory of tradable commodity.

FIG. 5 is an illustration of an embodiment of a method 500 for obtaining the tradable commodities. In this embodiment, the method comprises contacting $CO_2$ with an alkaline-earth-metal-containing water to produce a $CO_2$ sequestering product; determining a quantified amount of $CO_2$ sequestered in the $CO_2$ sequestering product; and producing a tradable commodity based on the determined quantified amount. In various embodiments, the method comprises transferring the tradable commodity to a customer, wherein the customer provides the $CO_2$. In some embodiments, the tradable commodity comprises a tradable instrument comprising a $CO_2$ emission certificate, a $CO_2$ emission permit, a $CO_2$ emission credit, a carbon offset, carbon allowance, or a criteria pollutant allowance. In some embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

In another embodiment, the system is a computer-implemented system of trading a $CO_2$ commodity, comprising: (a) a communication module comprising: (i) a input manager for receiving commodity request information and payment from a customer; (ii) an output manager for providing a tradable commodity to a user; and (iii) a user interface manager for transferring information about tradable commodities between a user and the system; and (b) a processing module configured to execute transactions with a customer, wherein the processing module is configured to provide at least one of the following features: a transfer manager configured to transfer commodities to a customer; an inventory manager configured to register changes to the inventory of tradable commodities available for transfer; or a receipt manager configured to receive payment from a customer and issue a receipt to said customer indicating a successful transaction wherein the tradable commodity represents a quantified amount of $CO_2$ sequestered in a $CO_2$ sequestering product. In various embodiments, the $CO_2$ sequestering product comprises a carbonate and/or bicarbonate comprising, e.g., calcium and/or magnesium. In various embodiments, the tradable commodity comprises a tradable instrument comprising: a $CO_2$ emission certificate, a $CO_2$ emission permit, a $CO_2$ emission credit, a carbon offset, carbon allowance, or a criteria pollutant allowance. In some embodiments, the tradable instrument comprises a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

In another embodiment, the method pertains to obtaining a carbon sequestration tradable commodity, comprising: (a) generating $CO_2$; (b) forwarding said $CO_2$ to a $CO_2$ sequesterer that: (i) contacts said $CO_2$ with an alkaline-earth-metal-containing water to produce a carbonate containing $CO_2$ sequestering product; (ii) determines a quantified amount of $CO_2$ sequestered in said $CO_2$ sequestering product; and (iii) produces a carbon sequestration tradable commodity based on said determined quantified amount; and (c) receiving said carbon sequestration tradable commodity from said $CO_2$ sequesterer.

In another embodiment the system comprises a computer system connected to an Internet and comprising: software configured to communicate with a customer wherein, a tradable commodity obtained by contacting $CO_2$ with an alkaline-earth-metal-containing water to obtain a $CO_2$ sequestering product may be transferred to the customer. In some embodiments of the system, the customer is in communication with a $CO_2$ commodity exchange. In some embodiments, the system is configured to transfer consideration to a $CO_2$ sequesterer that sequesters the $CO_2$ in the $CO_2$ sequestering product.

Utility

As will be appreciated, the methods and systems can be utilized in both comprehensive and targeted $CO_2$ sequestration processes, where the processes may be enacted at the individual, group, corporate, town, county, state, federal, national or international levels. By "sequestering $CO_2$" is meant the removal or segregation of $CO_2$ from the gaseous waste stream and fixating it into a stable non-gaseous form so that the $CO_2$ cannot escape into the atmosphere. By "$CO_2$ sequestration" is meant the placement of $CO_2$ into a storage stable form, such as an above-ground or under-water storage stable form, so that it is no longer present as, or available to be, a gas in the atmosphere. As such, sequestering of $CO_2$ according to methods of the invention results in prevention of $CO_2$ gas from entering the atmosphere and long term storage of $CO_2$ in a manner that $CO_2$ does not become part of the atmosphere. By storage stable form is meant a form of matter that can be stored above ground or underwater under exposed conditions (i.e., open to the atmosphere, underwater environment, etc.) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage stable form undergoes little if any degradation while stored, the amount of degradation if any as measured in terms of $CO_2$ gas release from the product will not exceed 5%/year, and in certain embodiments will not exceed 1%/year. The above-ground storage stable forms are storage stable under a variety of different environment conditions, e.g., from temperatures ranging from −100° C. to 600° C., or −100° C. to 50° C., or −50° C. to 50° C.; and humidity ranging from 0 to 100%, where the conditions may be calm, windy, turbulent or stormy.

Experimental Results

The following examples provides by way of illustration and not by way of limitation results achieved in accordance with the present system and method.

Example 1

A 20% $CO_2$/80% Air gas mixture was sparged into 1 L of seawater until a pH<5 is reached. Once reached, 1.0 g of $Mg(OH)_2$ was added to the 1 L carbonic acid/seawater solution. The 20/80 gas mixture continues to be sparged for 20 minutes to ensure maximal dissolution of the $Mg(OH)_2$ and gases. After dissolution, sparging is stopped and 2M NaOH is added until a pH of 9.8 is reached. Sparging of the 20/80 gas is resumed until a pH of 8.5 is reached. 2M NaOH and counter-additions of the 20/80 gas are continued maintaining a pH range between 8.5 and 9.8 until a total of 200 ml of 2M NaOH is added. A yield of 6.91 g was observed having a Coulometer reading of 10.6% Carbon (~80% Carbonate). This finding corresponds to sequestration of 2.89 g $CO_2$.

Example 2

A 20% $CO_2$/80% Air gas mixture was sparged into 1 L of seawater until a pH<5 is reached. Once reached, 2.69 g of $Mg(OH)_2$ was added to the 1 L carbonic acid/seawater solution. The 20/80 gas mixture continues to be sparged for 20 minutes to ensure maximal dissolution of the $Mg(OH)_2$ and gases. After dissolution, sparging is stopped and 2M NaOH is added until a pH of 9.8 is reached. Sparging of the 20/80 gas is resumed until a pH of 8.5 is reached. 2M NaOH and counter-additions of the 20/80 gas are continued maintaining a pH range between 8.5 and 9.8 until a total of 200 ml of 2M NaOH is added. A yield of 10.24 g was observed having a Coulometer reading of 9.7% Carbon (~75% Carbonate). This finding corresponds to sequestration of 4.01 g $CO_2$. SEM, EDS, and X-Ray Diffraction of the precipitated carbonates showed amorphous and crystalline Ca and Mg carbonates, and also the presence of Ca/Mg Carbonates.

Example 3

A 4260.0 kg of substantially pure carbon dioxide is obtained from California Industrial Rubber Company in Yuba, Calif. The carbon dioxide is purified of other contaminants found in the company's exhaust byproduct before it is used. In use, the $CO_2$ is passed into a $CO_2$ charger and precipitator where it is mixed with an excess of water from a seawater source having a calcium concentration of 0.4128 g $Ca^{2+}$/kg and an elevated pH of 8.3. The slurry is separated, and the resulting wet cake is washed with clean water and subsequently dried. The resulting product is massed at 7249.0 kg and is determined to be 98.6% pure $CaCO_3$ by elemental analysis, meaning 7148.0 kg of $CaCO_3$ are obtained. $CO_2$ is the limiting reagent. Accordingly, the theoretical yield of calcium carbonate is 9692.0 kg, and the percent yield is 73.8%. Thus, 3144 kg of $CO_2$ are successfully sequestered, or 3.144 metric tons of $CO_2$. A certified independent verifier approves by the California Climate Action Registry verified the emissions reduction of the project. An issuance fee was paid, and three Carbon Reduction Tons (CRT) are issued and recorded by the system. 0.144 metric tons of $CO_2$ are "banked" by the system as verified reductions that can be combined with other verified reductions in the future to obtain issuance of further tradable commodities. Three CRTs are then sold by the system to an individual from Palo Alto, Calif. to offset his family's carbon footprint in 2008. The individual provides $234.58 in exchange for the three CRTs.

Although the foregoing invention has been described in some embodiments with illustrations and examples, it should be understood that this invention is not limited to particular embodiments described, as such may. It should also be understood that in light of the teachings of this disclosure, certain changes and modifications may be made thereto without departing from scope of the appended claims.

The invention claimed is:

1. A method comprising:
contacting a waste gas from a fossil fuel combustion with a saltwater comprising divalent cations in a reactor configured to sequester carbon dioxide;
increasing the pH of the saltwater to form a precipitate comprising a carbonate or bicarbonate comprising the divalent cations;
determining the source and amount of carbon dioxide sequestered in the precipitate;
generating a tradable greenhouse gas certificate to represent the amount of carbon dioxide determined to be sequestered in the precipitate; and
producing a construction material consisting of a supplementary cementitous material, an aggregate or a combination thereof with the precipitate.

2. The method of claim 1, wherein the waste gas comprises carbon combustion gases from a cement plant, a power generating plant or an ore processing plant.

3. The method of claim 2, wherein the waste gas further comprises particulates or oxides of sulfur or nitrogen or other criteria pollutants.

4. The method of claim 3, wherein the saltwater comprises sea water, a brine, or a brackish water.

5. The method of claim 1, wherein the carbonate and/or bicarbonate comprises calcium or magnesium.

6. The method of claim 5, wherein the precipitate comprises a metastable composition that is more stable in saltwater than in freshwater.

7. The method of claim 6, wherein the precipitate comprises a saltwater source identifier.

8. The method of claim 7, wherein the salt water source identifier comprises strontium.

9. The method of claim 8, wherein the precipitate comprises sequestered criteria pollutants.

10. The method of claim 9, wherein the source of the greenhouse gas is determined by measuring the amount of an isotope in the precipitate and correlating the isotope measurement to the source of the greenhouse gas.

11. The method of claim 10, wherein the isotope measurement comprises measuring the $\delta^{13}C$ value of the precipitate.

12. The method of claim 11, comprising exchanging the certificate for a greenhouse gas emission credit or a carbon offset.

13. The method of claim 12, wherein the a certificate comprises a $CO_2$ emission certificate, a $CO_2$ emission permit, a $CO_2$ emission credit, a carbon offset, carbon allowance, a criteria pollutant allowance, a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

14. The method of claim 3, comprising charging a tipping fee for extracting criteria pollutants from the waste gas.

15. A gas sequestration system comprising:
a gas absorber configured to receive a waste gas from a fossil fuel combustion and to contact the waste gas with a saltwater comprising divalent cations;
a precipitator operably connected to the gas absorber and configured to receive the saltwater after contact with the waste gas and to precipitate a composition comprising the greenhouse gas carbon dioxide;
a pH increasing system operatively connected to the precipitator and configured to increase the pH of the saltwater to form a precipitate comprising a carbonate or a bicarbonate comprising the divalent cations;
an analytical apparatus operably connected to the precipitator and configured to receive and analyze the precipitate, and provide precipitate data for determining the source and amount of greenhouse gas sequestered in the precipitate;

a computer-implemented system operatively connected to the analytical apparatus and configured to receive the precipitate data from the analytical apparatus and generate a certificate that represents an amount of greenhouse gas sequestered in the precipitate; and a material production system operatively connected to the precipitator and configured to receive and convert the precipitate into a construction material consisting of a supplementary cementitous material, an aggregate or a combination thereof.

16. The gas sequestration system of claim 15, wherein the gas absorber is operably connected to receive the waste gas from a cement plant, a power generating plant or an ore processing plant.

17. The gas sequestration system of claim 16, wherein the gas absorber is configured to contact the waste gas with the saltwater and extract criteria pollutants from the waste gas.

18. The gas sequestration system of claim 17, the gas absorber is operably connected to receive salt water from a source comprising sea water, a brine, a brackish water or a solution comprising divalent cations.

19. The gas sequestration system of claim 18, wherein the gas absorber is operable to sequester carbon dioxide in the precipitate comprising calcium or magnesium carbonate or bicarbonate.

20. The gas sequestration system of claim 19, wherein the gas absorber is configured to produce a precipitate comprising a metastable compound that is more stable in salt water than in freshwater from the waste gas.

21. The gas sequestration system of claim 20, wherein the gas absorber is configured to produce a precipitate comprising a saltwater source identifier.

22. The gas sequestration system of claim 21, wherein the salt water source identifier comprises strontium.

23. The gas sequestration system of claim 22, wherein the pH increasing system comprises an electrochemical system operatively connected to the precipitator for providing a pH increase to the salt water.

24. The gas sequestration system of claim 23, wherein the analytical apparatus is configured to measure the amount of an isotope in the precipitate and provide isotope data for correlating the isotope measurement to the source of the greenhouse gas.

25. The gas sequestration system of claim 24, wherein the analytical apparatus is configured to provide isotope data for measuring the $\delta^{13}C$ value of the precipitate.

26. The gas sequestration system of claim 25, wherein the computer implemented system is configured to generate a certificate that correlates the sequestered carbon dioxide for a greenhouse gas emission credit or an offset.

27. The gas sequestration system of claim 26, wherein the computer-implemented system is configured to generate a certificate comprising a $CO_2$ emission certificate, a $CO_2$ emission permit, a $CO_2$ emission credit, a carbon offset, carbon allowance, a criteria pollutant allowance, a Verified Emissions Reductions unit (VER), a Carbon Financial Instrument (CFI), a European Union Allowance (EUA), a Certified Emission Reduction unit (CER), an Emission Reduction Unit (ERU), a Voluntary Carbon Unit, or a tipping fee.

28. The gas sequestration system of claim 17, wherein the computer implemented system is configured to determine a tipping fee payable for extracting criteria pollutants from the waste gas.

29. The method of claim 15, wherein the construction material comprises a cementitous material, an aggregate product, or a man-made structure.

30. The method of claim 29, wherein the cementitous material comprises a hydraulic cement.

31. The gas sequestration system of claim 15, wherein the material production system comprises a dryer operable connected to the precipitator and configured to dewater the precipitate.

32. The gas sequestration system of claim 31, further comprising a building products factory operatively connected to the dryer and configured receive dried precipitate and produce the construction material.

* * * * *

UNITED STATES PATENT AND TRADEMARK OFFICE
CERTIFICATE OF CORRECTION

| | | |
|---|---|---|
| PATENT NO. | : 7,966,250 B2 | Page 1 of 1 |
| APPLICATION NO. | : 12/557492 | |
| DATED | : June 21, 2011 | |
| INVENTOR(S) | : B. Constantz et al. | |

It is certified that error appears in the above-identified patent and that said Letters Patent is hereby corrected as shown below:

At column 36, line 37 of the printed patent, please change "configured receive dried" to -- configured to receive dried --.

Signed and Sealed this
Twentieth Day of March, 2012

David J. Kappos
*Director of the United States Patent and Trademark Office*